(12) United States Patent
Oh

(10) Patent No.: US 12,212,836 B2
(45) Date of Patent: Jan. 28, 2025

(54) CAMERA DEVICE WITH 5-AXIS HAND-SHAKE CORRECTION OF YAWING, PITCHING, ROLLING, X-AXIS SHIFT, AND Y-AXIS-SHIFT

(71) Applicant: LG INNOTEK CO., LTD., Seoul (KR)

(72) Inventor: Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 132 days.

(21) Appl. No.: 17/793,321

(22) PCT Filed: Feb. 4, 2021

(86) PCT No.: PCT/KR2021/001462
§ 371 (c)(1),
(2) Date: Jul. 15, 2022

(87) PCT Pub. No.: WO2021/158031
PCT Pub. Date: Aug. 12, 2021

(65) Prior Publication Data
US 2023/0353858 A1    Nov. 2, 2023

(30) Foreign Application Priority Data
Feb. 6, 2020 (KR) .......... 10-2020-0014406

(51) Int. Cl.
*H04N 23/58* (2023.01)
*H04N 23/55* (2023.01)
(52) U.S. Cl.
CPC ............ *H04N 23/58* (2023.01); *H04N 23/55* (2023.01)

(58) Field of Classification Search
CPC ........ H04N 23/58; H04N 23/55; H04N 23/54; H04N 23/687; H04N 23/57; G02B 7/08; G02B 27/646; G02B 3/12
See application file for complete search history.

(56) References Cited

U.S. PATENT DOCUMENTS

| 2011/0096178 A1* | 4/2011 | Ryu .......................... G03B 5/02 |
| | | 348/208.2 |
| 2011/0097062 A1* | 4/2011 | Tsuruta .................. H04N 23/68 |
| | | 396/55 |

(Continued)

FOREIGN PATENT DOCUMENTS

| CN | 205427287 U | 8/2016 |
| JP | 2012-211995 | * 11/2012 |

(Continued)

*Primary Examiner* — Hung H Lam
(74) *Attorney, Agent, or Firm* — Birch, Stewart, Kolasch & Birch, LLP

(57) ABSTRACT

The present embodiment relates to a camera device comprising: a camera module including a first substrate, an image sensor arranged on the first substrate, and a lens arranged at a position corresponding to that of the image sensor, a first driving unit for rotating the camera module around a first axis that is vertical with respect to the optical axis of the image sensor; a second driving unit for rotating the camera module around a second axis that is vertical with respect to the optical axis and the first axis; and a third driving unit for rotating the camera module around the optical axis, wherein, when the camera module moves by means of at least any one from among the first driving unit, the second driving unit, and the third driving unit, the lens moves together with the image sensor while aligned with the optical axis.

20 Claims, 18 Drawing Sheets

(56) References Cited

U.S. PATENT DOCUMENTS

| | | |
|---|---|---|
| 2013/0128360 A1 | 5/2013 | Minamisawa et al. |
| 2014/0354833 A1 | 12/2014 | Takizawa |
| 2015/0009400 A1* | 1/2015 | Shin .................. G03B 5/00 348/373 |
| 2016/0048002 A1* | 2/2016 | Cheng ............. G02B 27/646 359/557 |
| 2016/0191754 A1* | 6/2016 | Cho .................. H04N 23/57 348/357 |
| 2018/0113274 A1 | 4/2018 | Jung et al. |
| 2019/0018259 A1 | 1/2019 | Minamisawa et al. |
| 2019/0141248 A1 | 5/2019 | Hubert et al. |
| 2019/0222758 A1 | 7/2019 | Goldenberg et al. |
| 2019/0306430 A1 | 10/2019 | Kunick et al. |
| 2020/0012068 A1 | 1/2020 | Lim et al. |
| 2020/0012170 A1* | 1/2020 | Hong ................. G02B 26/02 |

FOREIGN PATENT DOCUMENTS

| | | |
|---|---|---|
| JP | 2012-211995 A | 11/2012 |
| JP | 2018-77390 A | 5/2018 |
| KR | 10-2019-0007377 A | 1/2019 |
| KR | 10-2019-0072690 A | 6/2019 |
| KR | 10-2019-0120356 A | 10/2019 |
| KR | 10-2020-0005436 A | 1/2020 |
| WO | WO 2018/165535 A1 | 9/2018 |

\* cited by examiner

CAMERA DEVICE WITH 5-AXIS HAND-SHAKE CORRECTION OF YAWING, PITCHING, ROLLING, X-AXIS SHIFT, AND Y-AXIS-SHIFT

CROSS REFERENCE TO RELATED APPLICATIONS

This application is the National Phase of PCT International Application No. PCT/KR2021/001462, filed on Feb. 4, 2021, which claims priority under 35 U.S.C. 119 (a) to Patent Application No. 10-2020-0014406, filed in the Republic of Korea on Feb. 6, 2020, all of which are hereby expressly incorporated by reference into the present application.

TECHNICAL FIELD

The present embodiment relates to a camera device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, a camera device in recent years has been applied with a hand-shake correction function that prevents an image from being shaken due to hand-shake of a photographer.

As one of the methods for performing the hand-shake correction function, there is a module tilt method. In a conventional camera device of a module tilt method, electrical signals of about 20 or more image sensors are connected to a fixing unit through a printed circuit board (PCB) to move the image sensors.

However, in this case, there is a problem in that the movement of the movable part is restricted, and the resistance (load) to the movement of the movable part is also large. In addition, since the dispersion of the modulus of elasticity is large due to the dispersion of Young's modulus of the raw material inside the PCB and the PCB processing tolerance, additional work is required to reduce the performance dispersion.

In particular, since the rigidity in the radial direction is high due to the PCB structure, the resistance to rotational driving is high, and therefore, the aforementioned structure has a problem in that it is difficult to be applied for compensation in the rolling direction, that is, compensation for rotational shaking.

DETAILED DESCRIPTION OF THE INVENTION

Technical Subject

The present embodiment is intended to provide a camera device capable of 3-axis hand-shake correction of yawing, pitching, and rolling as an OIS structure of a module tilt method.

In addition, it is intended to provide a camera device capable of 5-axis hand-shake correction of yaw, pitching, rolling, x-axis shift, and y-axis shift.

In addition, it is intended to provide a camera device with reduced resistance to the movement of the movable part by using an elastic member rather than a PCB to electrically conduct an image sensor, which is a component of the movable part, with the fixed part.

Technical Solution

A camera device according to the present embodiment comprises: a camera module comprising a first substrate, an image sensor being disposed on the first substrate, and a lens being disposed at a position corresponding to the image sensor; a first driving unit for rotating the camera module about a first axis perpendicular to an optical axis of the image sensor; a second driving unit for rotating the camera module about the optical axis and a second axis perpendicular to the first axis; and a third driving unit for rotating the camera module about the optical axis, wherein the camera module in a state in which the lens and the image sensor are aligned is tilted about the first axis and the second axis by the first to third driving units and may be rotated about the optical axis.

When the camera module is moved by at least one of the first driving unit, the second driving unit, and the third driving unit, the lens may move together with the image sensor while being aligned with the optical axis.

The camera module comprises a focus-tunable lens, wherein the focus-tunable lens is tilted about the first axis and the second axis together with the image sensor and rotated about the optical axis by the first to third driving units, and wherein the focus-tunable lens may move the focus along the first axis and the second axis.

The camera module may comprise: a fourth driving unit for shifting the lens along the first axis; and a fifth driving unit for shifting the lens along the second axis.

It comprises a second substrate; the first substrate and the second substrate are connected by a connection member; the connection member comprises a first coupling part comprising a first terminal being connected to the terminal of the first substrate, a second coupling part comprising a second terminal being connected to a terminal of the second substrate, and a connection part for connecting the first coupling part and the second coupling part; and the connection part may comprise a plurality of springs being spaced apart from each other.

The second coupling part comprises a rigid printed circuit board (RPCB) being connected to the plurality of springs, and a flexible printed circuit board (FPCB) being connected to the RPCB and comprising the second terminal, wherein the first coupling part is being disposed inside the RPCB of the second coupling part, and wherein the plurality of springs may comprise 28 springs.

The camera device comprises: a second substrate; and a base being disposed on the second substrate, wherein an elastic member is disposed between the base and the camera module, and wherein the elastic member may comprise an inner portion comprising a protrusion being in contact with the camera module, an outer portion being disposed on the base, and a connection part connecting the inner portion and the outer portion.

The camera device may comprise: a base being disposed below the camera module; a housing being disposed on the base; a holder being disposed inside the housing and being coupled to the camera module; an upper elastic member connecting the holder and the housing; and a plurality of wires connecting the upper elastic member and the base.

The camera module may comprise: a housing; a bobbin being disposed inside the housing and being coupled to the lens; a base being disposed below the bobbin; a first coil being disposed on the bobbin; a magnet being disposed in the housing and facing the first coil; and a second coil being disposed on the base and facing the magnet.

The lens of the camera module may comprise a plurality of lenses, and the focus-tunable lens may comprise a liquid lens being disposed between the plurality of lenses.

The first driving unit comprises a first magnet being disposed in the camera module and having different polarities on both side portions of an outer side surface thereof and a first coil facing the first magnet; the second driving unit comprises the first magnet and a second coil facing the first magnet and receiving a current separately from the first coil; and the third driving unit may comprise a second magnet being disposed in the camera module and having different polarities on both side portions of an outer side surface thereof and a third coil facing the second magnet and receiving current separately from the first coil and the second coil.

The outer side surface of the camera module comprises a first side surface and a second side surface being disposed opposite to each other, and a third side surface and a fourth side surface being disposed opposite to each other between the first side surface and the second side surface; the first magnet comprises a first-first magnet being disposed on the first side surface of the camera module, and a first-second magnet being disposed on the second side surface of the camera module; and the first coil may comprise a first-first coil facing the first-first magnet and a first-second coil facing the first-second magnet.

The second coil may comprise: a second coil facing the first-first magnet and being disposed at one side of the first-first coil; a second coil facing the first-first magnet and being disposed at the other side of the first-first coil; a second-third coil facing the first-second magnet and being disposed at one side of the first-second coil; and a second-fourth coil facing the first-second magnet and being disposed at the other side of the first-second coil.

The second magnet comprises a second-first magnet being disposed on the third side surface of the camera module and a second-second magnet being disposed on the fourth side surface of the camera module; and the third coil may comprise a third-first coil facing the second-first magnet and a third-second coil facing the second-second magnet.

When the lens moves by any one or more of the fourth driving unit and the fifth driving unit, the lens may move separately from the image sensor.

When the camera module is moved by any one or more of the first driving unit, the second driving unit, and the third driving unit, the image sensor may move together with the lens.

The optical device according to the present embodiment may comprise a main body; a camera device being disposed on the main body; and a display disposed in the main body and outputting an image photographed by the camera device.

The camera device according to the present embodiment may comprise: a stator; a camera module comprising a first substrate, an image sensor being disposed on the first substrate, and a lens being disposed at a position corresponding to the image sensor; a first driving unit for rotating the camera module in a first direction against the stator; a second driving unit for rotating the camera module in a second direction different from the first direction against the stator; a third driving unit for rotating the camera module in a third direction different from the first and second directions against the stator; a fourth driving unit for moving the lens in a fourth direction different from the first to third directions; and a fifth driving unit for moving the lens in a fifth direction different from the first to fourth directions.

The first direction is a direction rotating about a first axis perpendicular to an optical axis of the image sensor, the second direction is a direction rotating about the optical axis and a second axis perpendicular to the first axis, the third direction is a direction rotating about the optical axis, the fourth direction is a direction parallel to the first axis, and the fifth direction may be a direction parallel to the second axis.

The first direction is a direction in which the camera module is yawed, the second direction is a direction in which the camera module is pitched, and the third direction may be a direction in which the camera module is rolled.

The camera module may comprise a focus-tunable lens comprising the fourth driving unit and the fifth driving unit.

The camera device comprises: a camera module comprising a first substrate, an image sensor being disposed on the first substrate, and a lens being disposed at a position corresponding to the image sensor; a first driving unit for moving the camera module in a first direction; a second driving unit for moving the camera module in a second direction; and a third driving unit for rotating the camera module in a third direction, wherein the camera module may comprise a fourth driving unit for tilting the lens in a fourth direction and a fifth direction.

Advantageous Effects

Through the present embodiment, the hand-shake correction function can be performed in a module tilt method with three axes of yawing, pitching, and rolling.

In addition, the present embodiment can perform hand-shake correction function with 5 axes of yawing, pitching, rolling, x-axis shifting, and y-axis shifting.

In addition, the present embodiment may perform: x-axis, y-axis shifting through lens shifting; yawing and pitching through tilting of lens and image sensor; and rolling through the rotation of the lens and image sensor.

In addition, as the resistance against the movement of the movable part is reduced, the amount of current consumed when performing the hand-shake correction function can be reduced.

In particular, current consumption can be minimized even during hand-shake correction in the rolling direction.

BRIEF DESCRIPTION OF DRAWINGS

FIGS. 5b and 5c are enlarged views of a part of FIG. 5a.

BEST MODE

Figure 1:
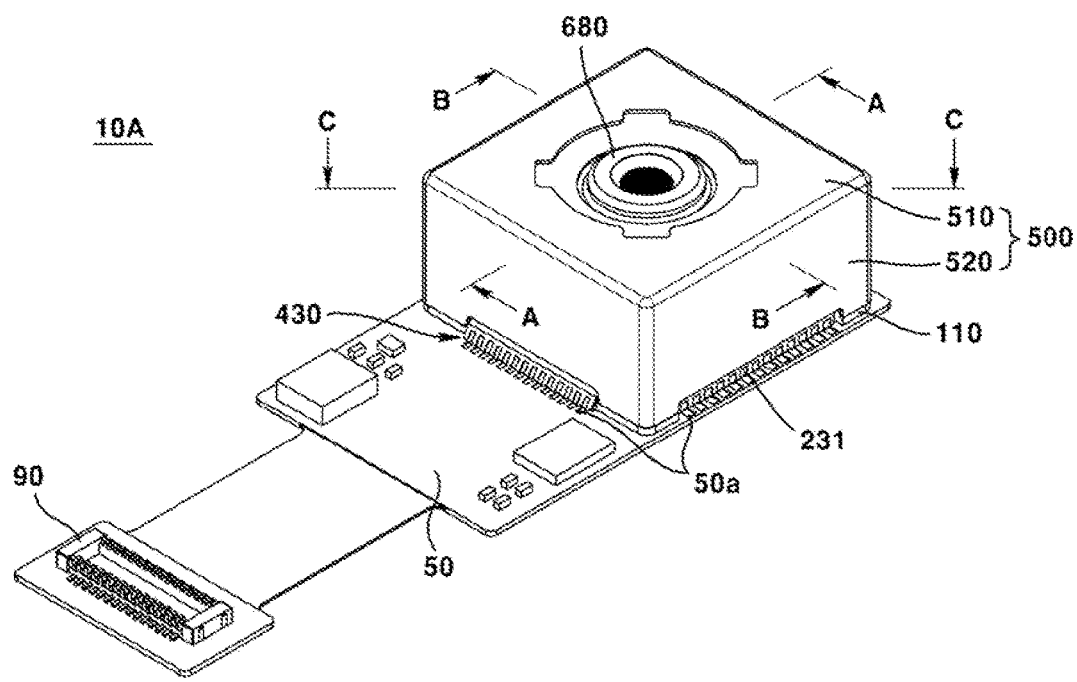
FIG. 1 is a perspective view of a camera device according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

An 'optical axis direction' used hereinafter is defined as 'an optical axis (refer to OA in FIG. 8) direction of a lens and/or an image sensor being coupled to a lens driving device.

The 'vertical direction' used hereinafter may be a direction parallel to the optical axis direction. The vertical direction may correspond to the 'z-axis direction (refer to FIG. 8)'. The 'horizontal direction' used below may be a direction perpendicular to the vertical direction. That is, the horizontal direction may be a direction perpendicular to the optical axis. Accordingly, the horizontal direction may comprise an 'x-axis direction' and a 'y-axis direction' (refer to FIG. 8).

The 'auto focus function' used hereinafter is defined as a function in which, in order to obtain a clear image of a subject on the image sensor, a lens is moved in an optical axis direction according to the distance of the subject and the distance from the image sensor is adjusted to automatically focus on the subject. Meanwhile, 'auto focus' may correspond to 'AF (Auto Focus)'.

The 'hand-shake correction function' used hereinafter is defined as a function that moves the lens and/or the image sensor to cancel the vibration (movement) generated in the image sensor by an external force. Meanwhile, 'hand-shake correction' may correspond to 'optical image stabilization (OIS)'.

'Yawing' used hereinafter may be a movement in a yaw direction rotating about a y-axis (refer to FIGS. 17 and 18 (a)). 'Pitching' used hereinafter may be a movement in a pitch direction rotating about an x-axis (refer to FIGS. 17 and 18 (b)). 'Rolling' used hereinafter may be a movement in a roll direction rotating about a z-axis (refer to FIGS. 17 and 18 (c)).

Hereinafter, any one of the "first substrate 690", "second substrate 50", and "third substrate 230" is referred to as a first substrate, another one is referred to as a second substrate, yet another one is referred to as a third substrate, and the remaining one may be referred to as a fourth substrate. That is, the first, second, and the like described in front of the substrate are only for distinction among the substrates. Furthermore, the use of the first, second, and the like may be applied similarly to configurations other than the substrate.

Hereinafter, the configuration of the camera device will be described with reference to the drawings.

Figure 2:
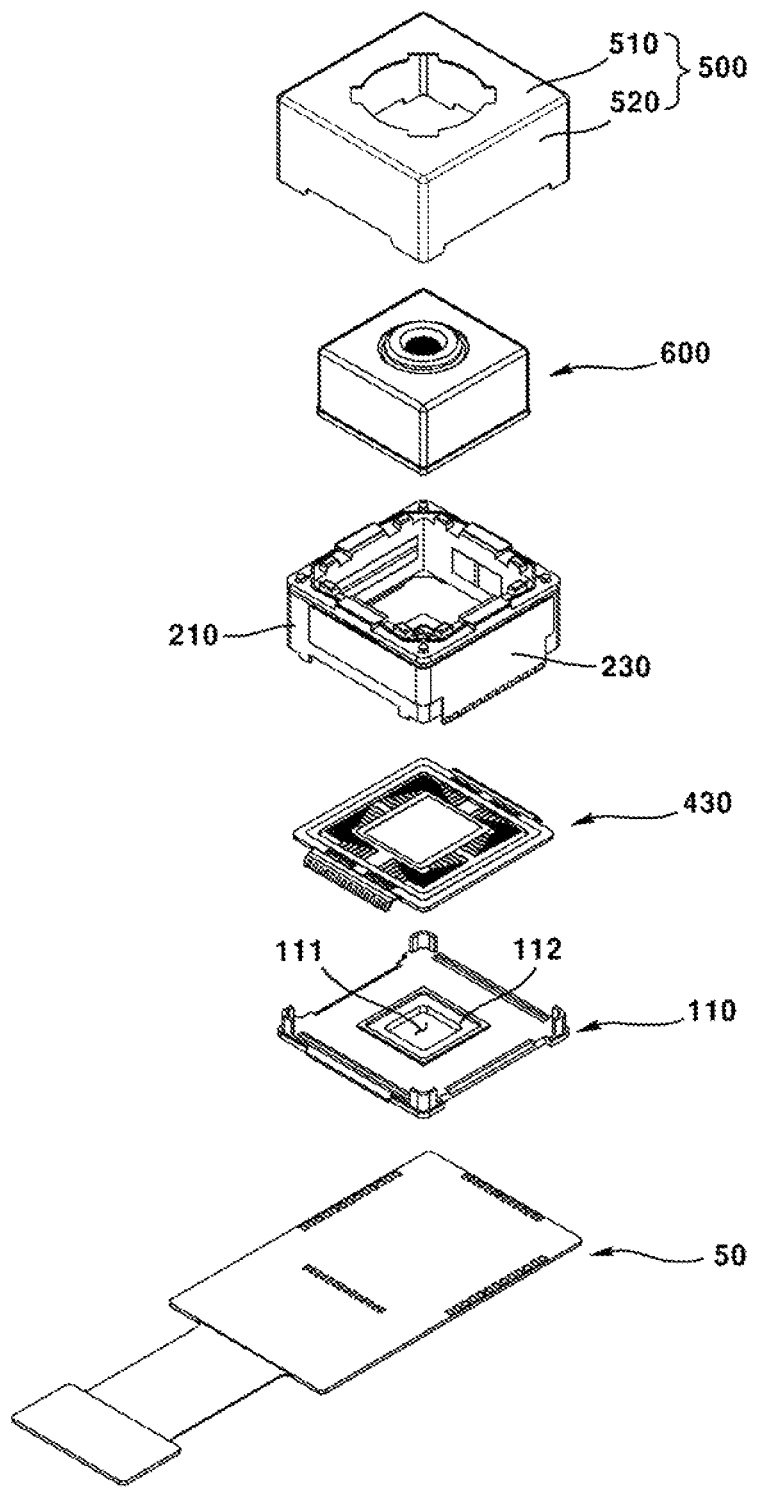
FIG. 2 and FIG. 3 are exploded perspective views of a camera device according to the present embodiment.
Figure 3:
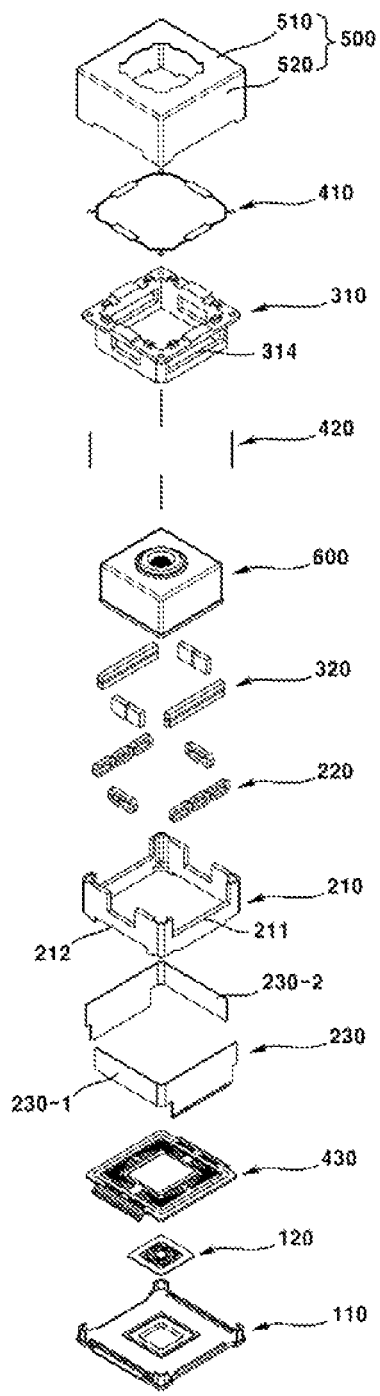
Figure 4:
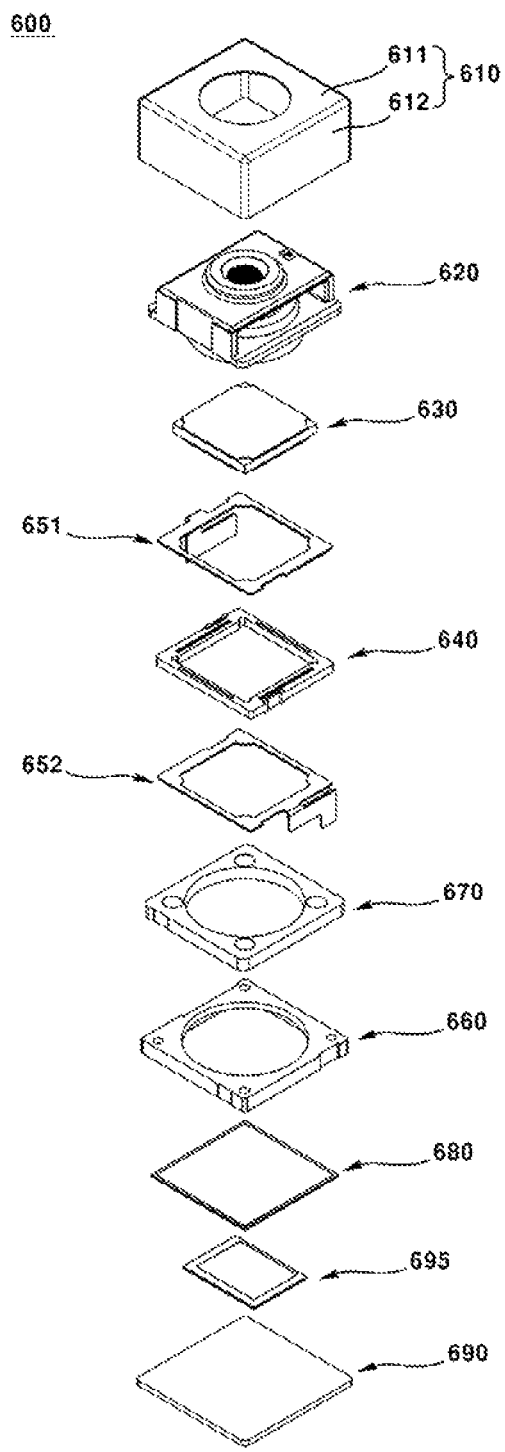
FIG. 4 is an exploded perspective view of a camera module according to the present embodiment.
Figure 5A:
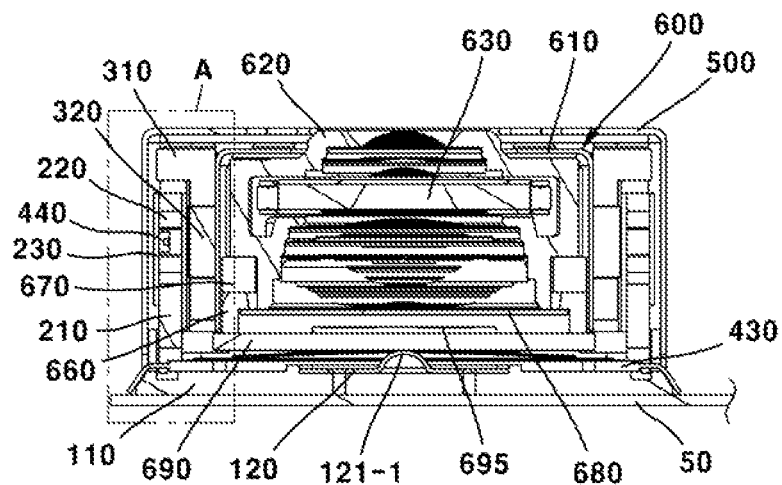
FIG. 5a is a cross-sectional view taken along line A-A of FIG. 1.
Figure 5B:
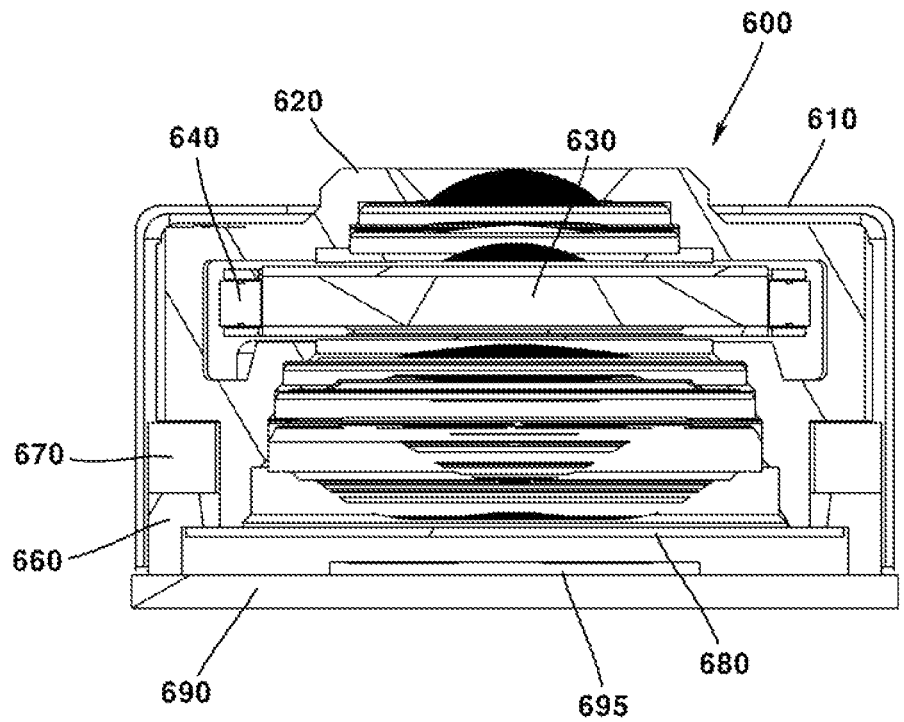
Figure 5C:
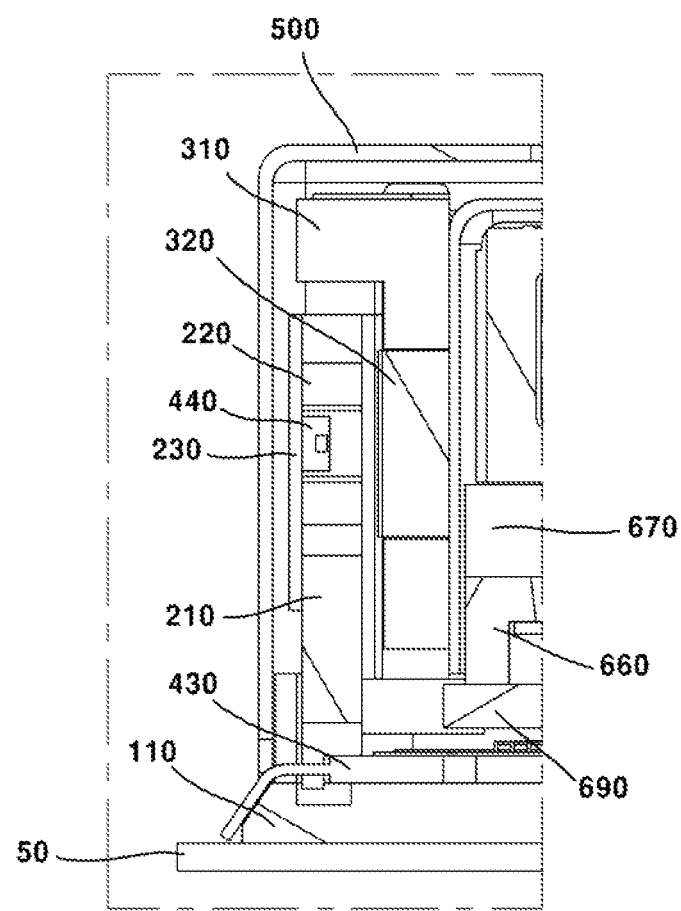
Figure 6:
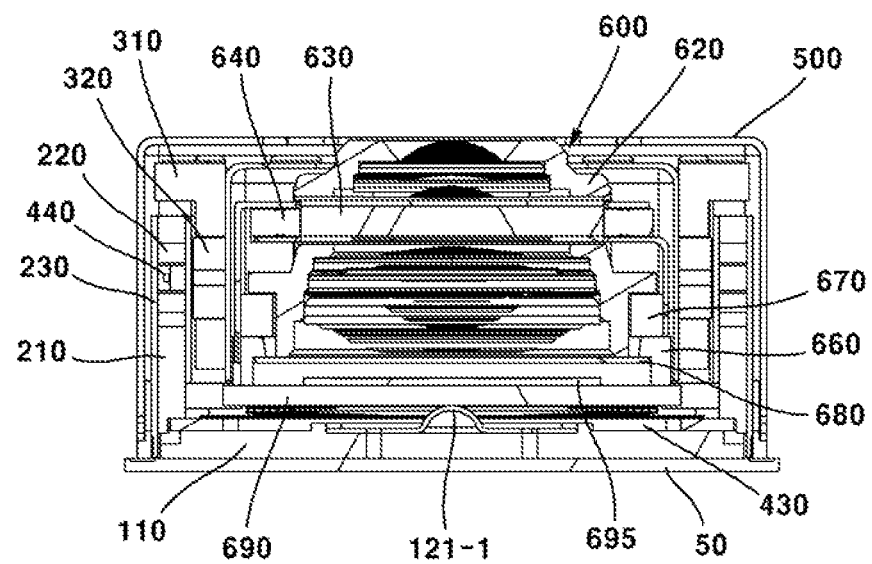
FIG. 6 is a cross-sectional view taken along line B-B of FIG. 1.
Figure 7:
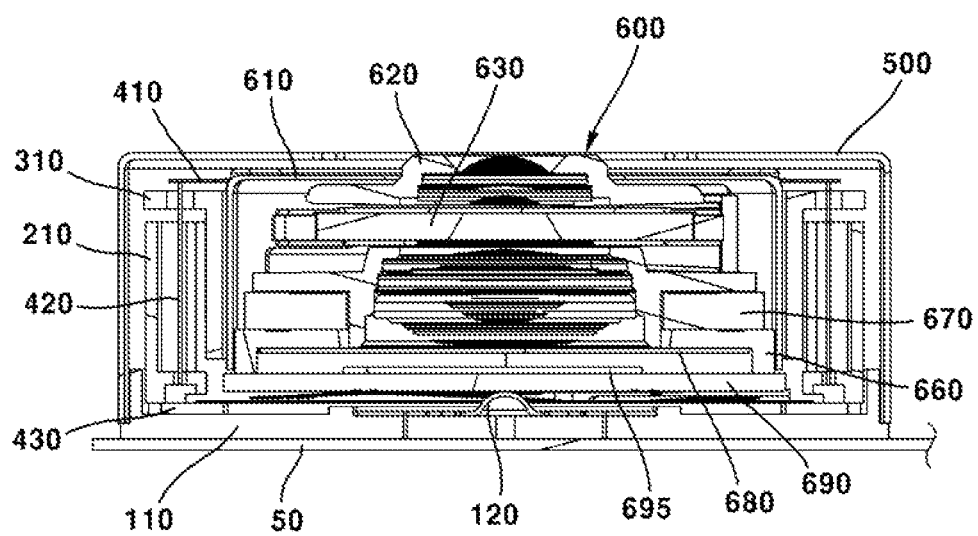
FIG. 7 is a cross-sectional view taken along line C-C of FIG. 1.
Figure 8:
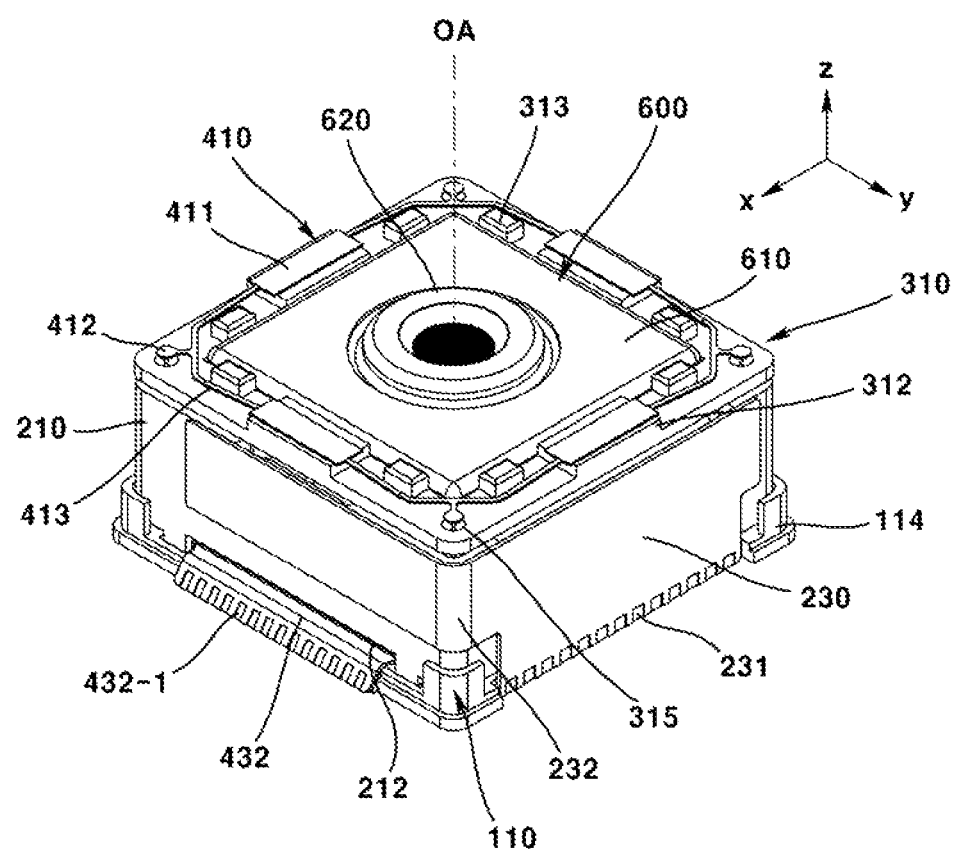
FIG. 8 is a perspective view of a partial configuration of a camera device according to the present embodiment.
Figure 9:
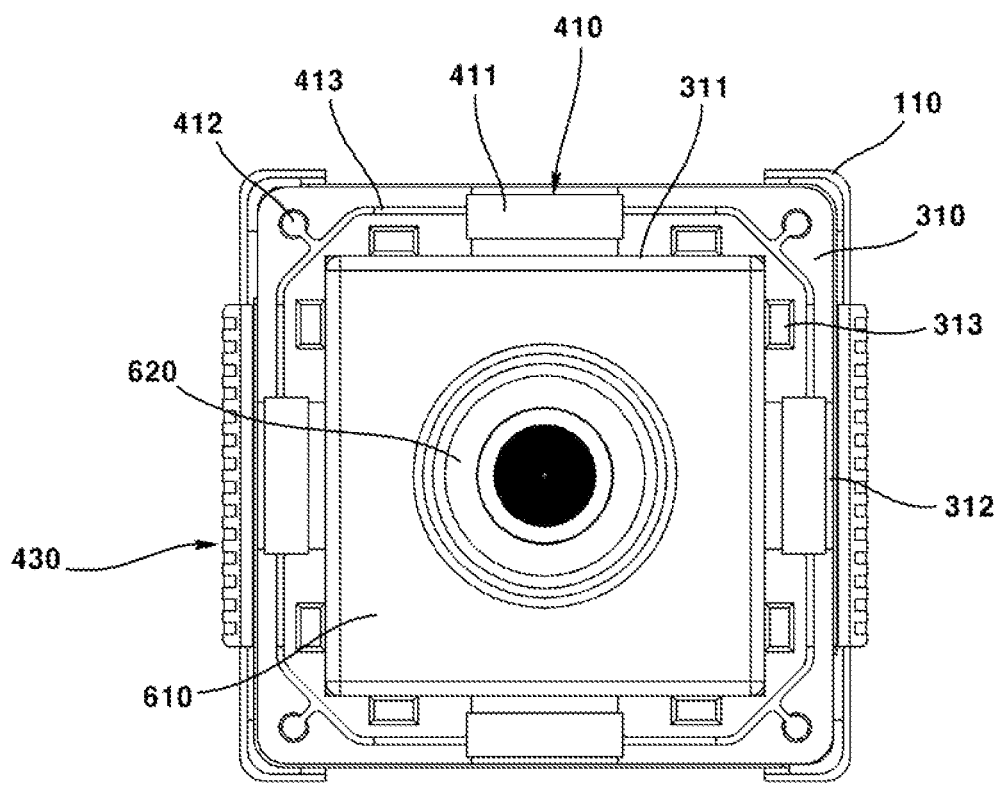
FIG. 9 is a plan view of a partial configuration of a camera device according to the present embodiment.
Figure 10A:
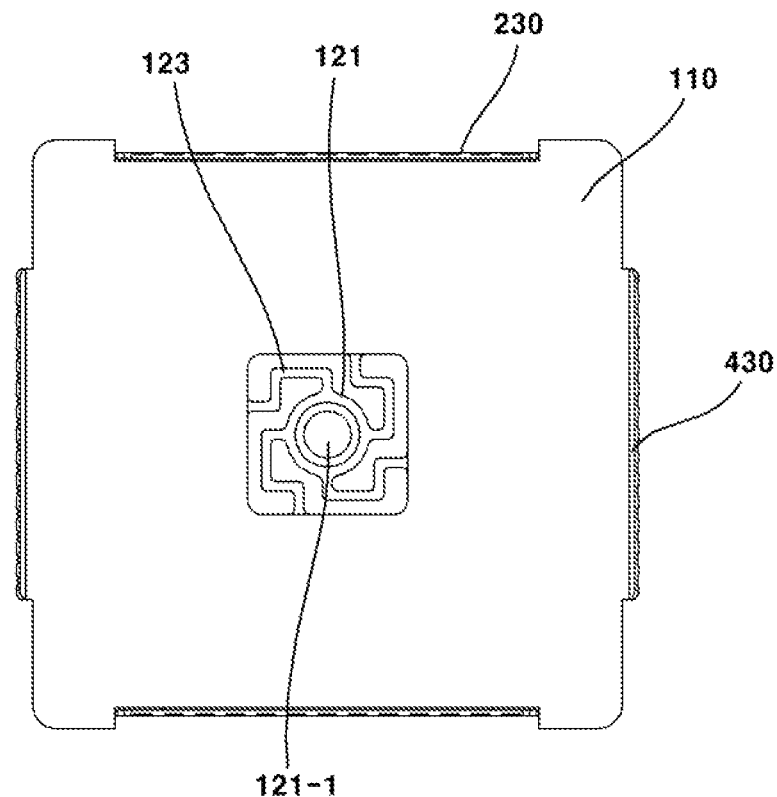
FIG. 10a is a bottom view of a partial configuration of a camera device according to the present embodiment.
Figure 10B:
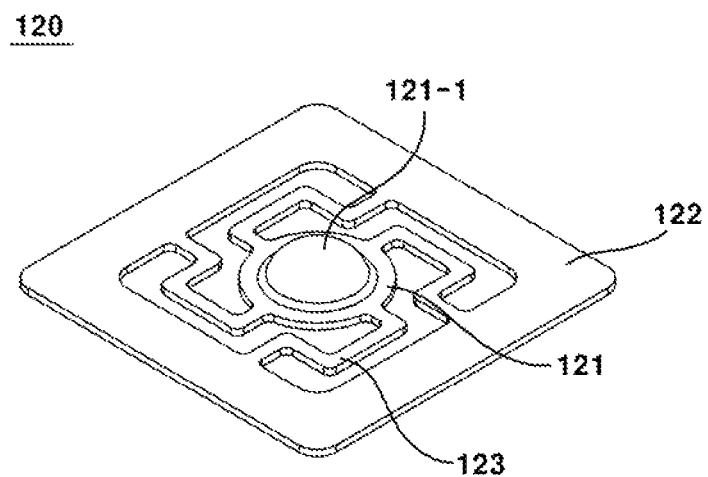
FIG. 10b is a perspective view of an elastic member according to the present embodiment.
Figure 11:
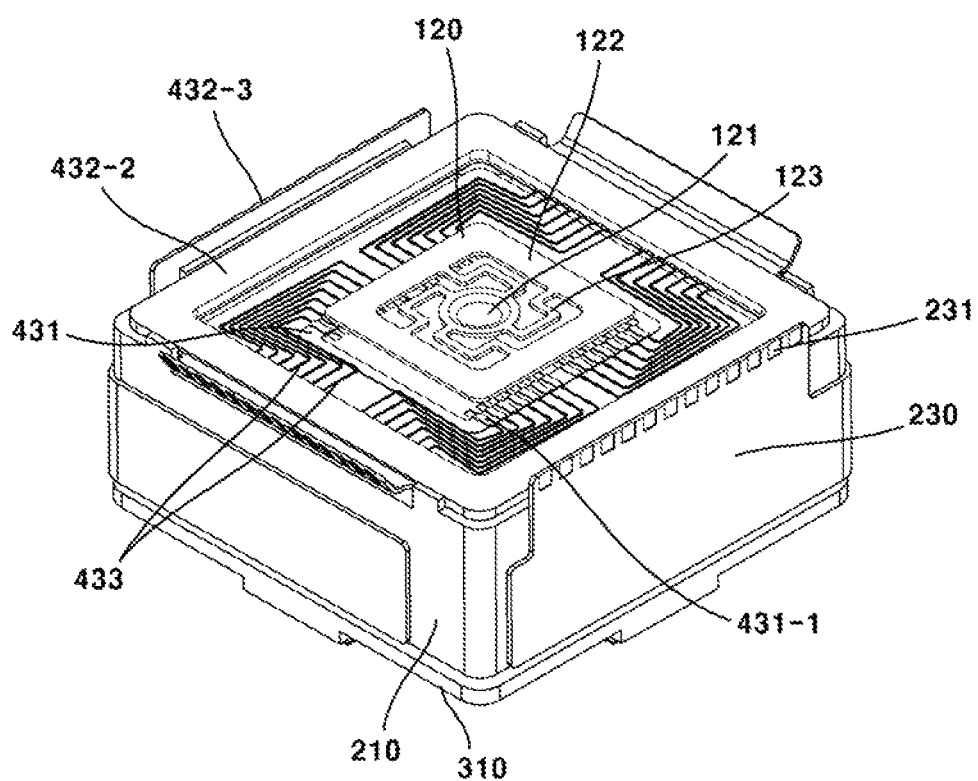
FIG. 11 is a bottom perspective view of a partial configuration of a camera device according to the present embodiment.
Figure 12:
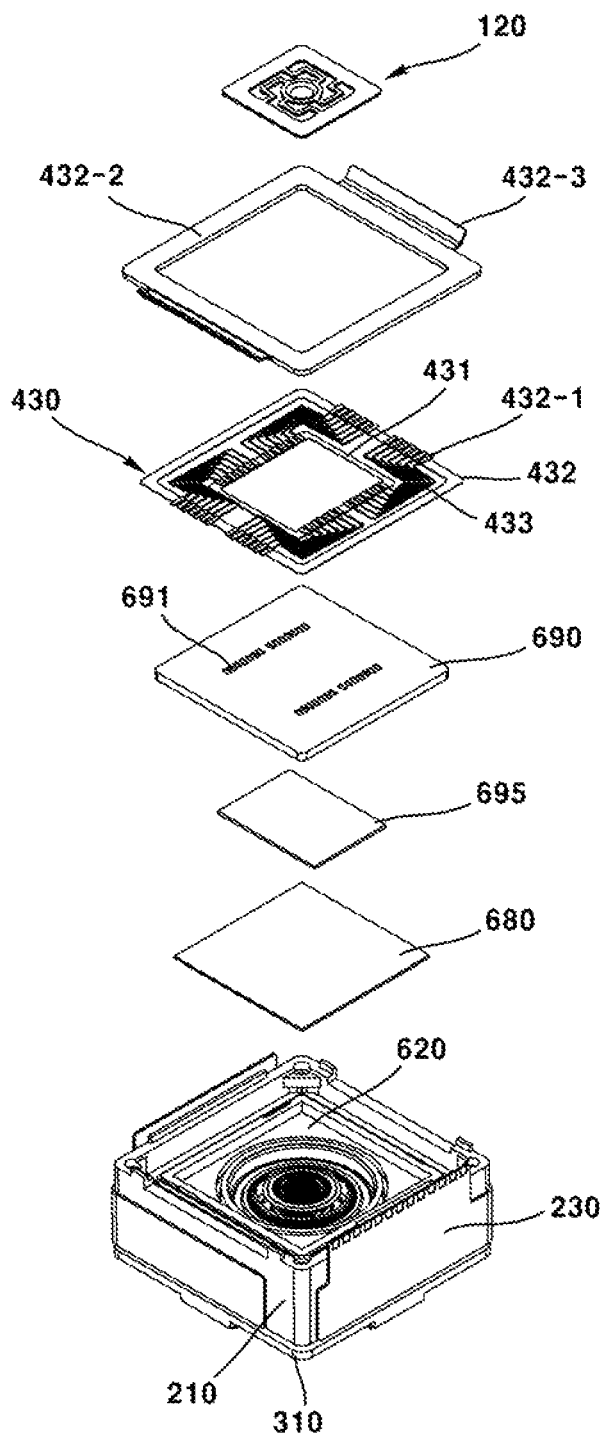
FIG. 12 is an exploded perspective view of a partial configuration of the camera device of FIG. 11.
Figure 13:
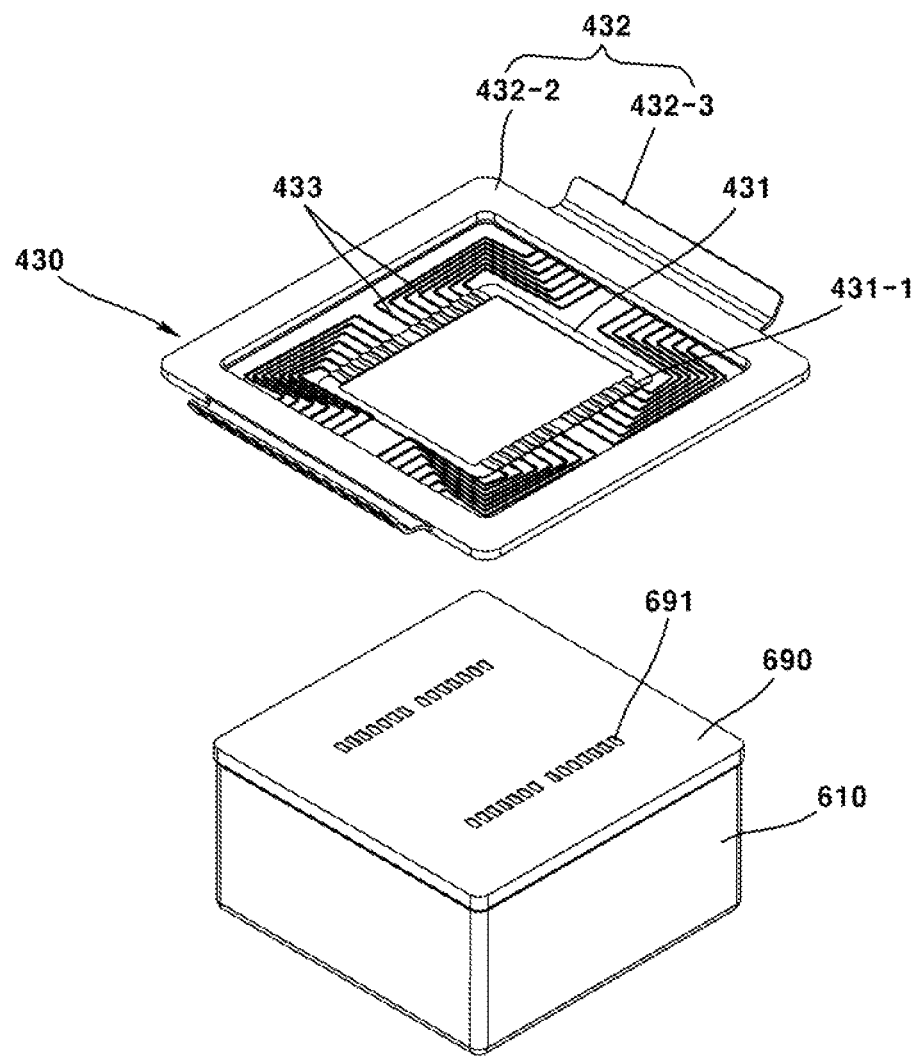
FIG. 13 is a bottom perspective view of a partial configuration of a camera device according to the present embodiment.
Figure 14:
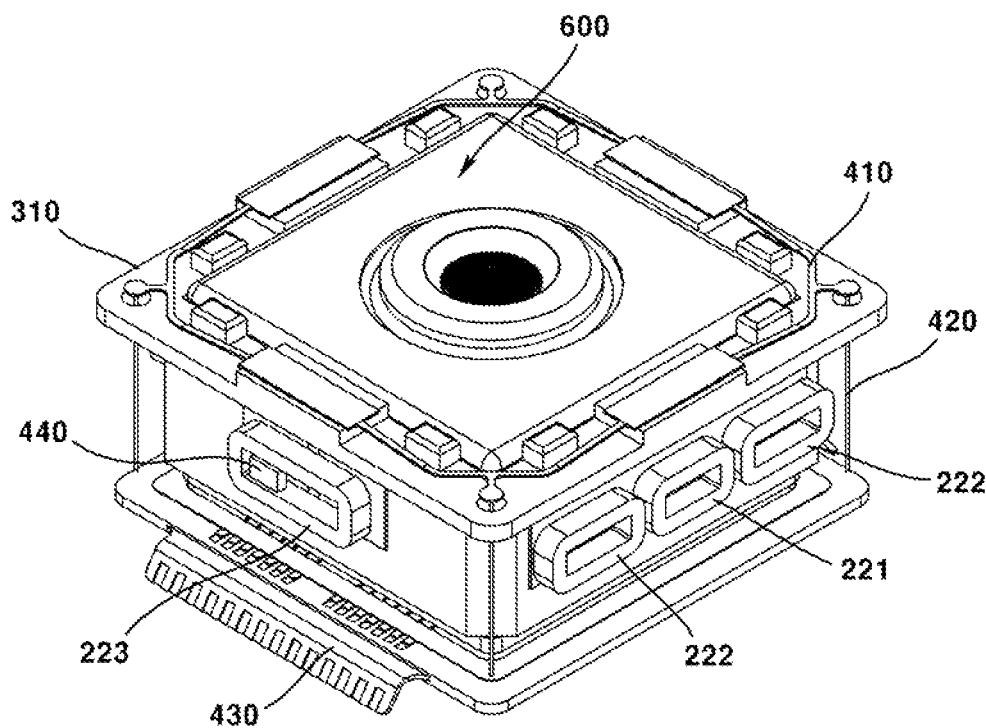
FIG. 14 is a perspective view of a partial configuration of a camera device according to the present embodiment.
Figure 15:
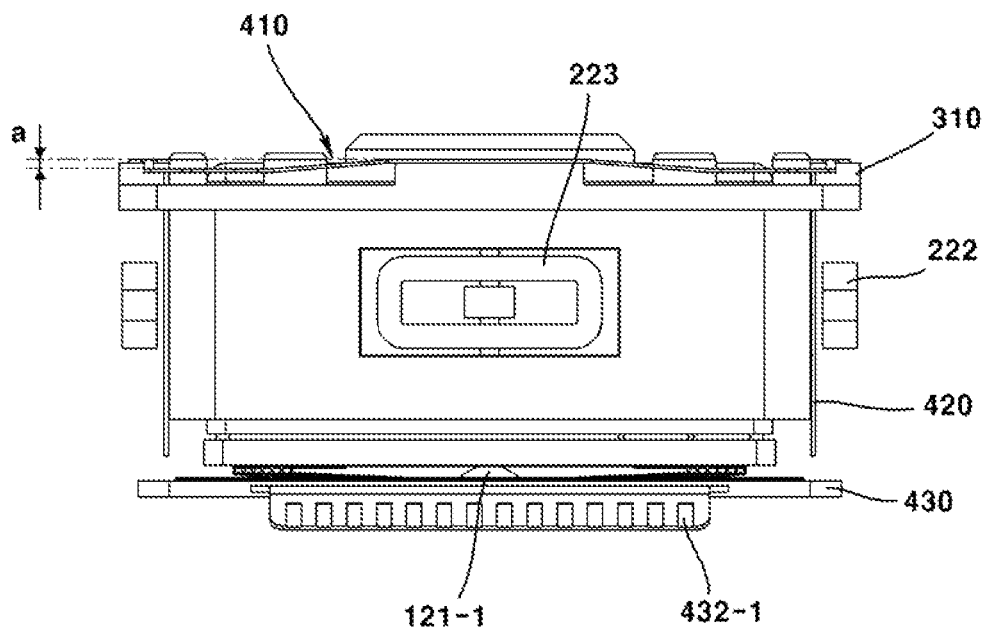
FIG. 15 is a side view of a partial configuration of a camera device according to the present embodiment.
Figure 16:
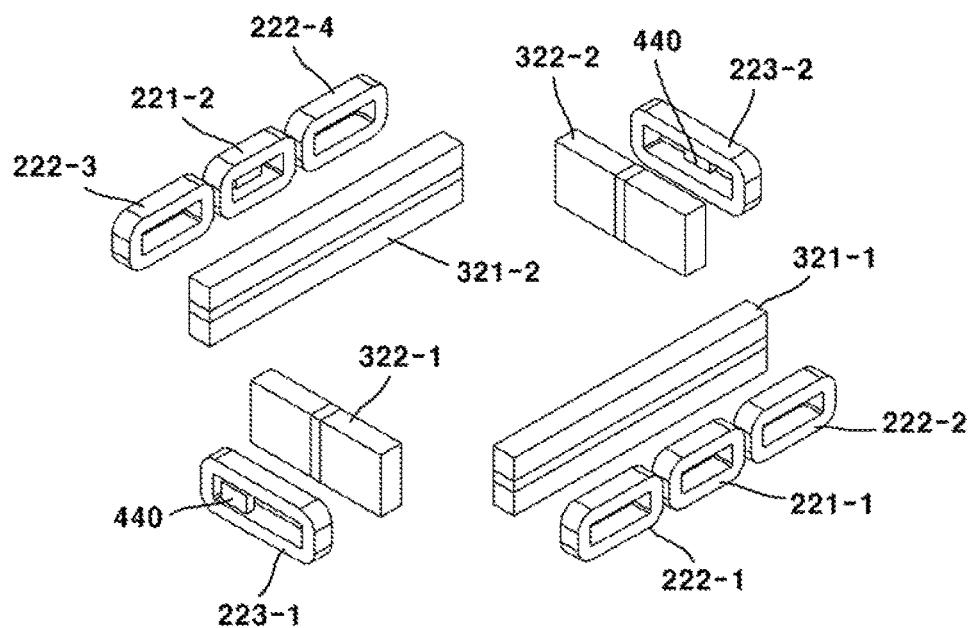
FIG. 16 is a perspective view illustrating a magnet and a coil of a camera device according to the present embodiment.

FIG. 1 is a perspective view of a camera device according to the present embodiment; FIG. 2 and FIG. 3 are exploded perspective views of a camera device according to the present embodiment; FIG. 4 is an exploded perspective view of a camera module according to the present embodiment; FIG. 5a is a cross-sectional view taken along line A-A of FIG. 1; FIGS. 5b and 5c are enlarged views of a part of FIG. 5a; FIG. 6 is a cross-sectional view taken along line B-B of FIG. 1; FIG. 7 is a cross-sectional view taken along line C-C of FIG. 1; FIG. 8 is a perspective view of a partial configuration of a camera device according to the present embodiment; FIG. 9 is a plan view of a partial configuration of a camera device according to the present embodiment; FIG. 10a is a bottom view of a partial configuration of a camera device according to the present embodiment; FIG. 10b is a perspective view of an elastic member according to the present embodiment; FIG. 11 is a bottom perspective view of a partial configuration of a camera device according to the present embodiment; FIG. 12 is an exploded perspective view of a partial configuration of the camera device of FIG. 11; FIG. 13 is a bottom perspective view of a partial configuration of a camera device according to the present embodiment; FIG. 14 is a perspective view of a partial configuration of a camera device according to the present embodiment; FIG. 15 is a side view of a partial configuration of a camera device according to the present embodiment; FIG. 16 is a perspective view illustrating a magnet and a coil of a camera device according to the present embodiment; FIG. 17 (*a*) is a diagram for explaining a yaw driving to one side of a camera module in a camera device according to the present embodiment; FIG. 17 (*b*) is a diagram for explaining a pitching driving to one side of a camera module; FIG. 17 (*c*) is a diagram for explaining the rolling driving to one side of a camera module; FIG. 18 (*a*) is a diagram for explaining a yaw driving to the other side of a camera module in a camera device according to the present embodiment; FIG. 18 (*b*) is a diagram for explaining a pitching driving to the other side of a camera module; FIG. 18 (*c*) is a diagram for explaining the rolling driving of a camera module to the other side; and FIG. 19 is a diagram for explaining 5-axis correction of a camera device according to the present embodiment.

The camera device 10A may comprise a camera module. The camera device 10A may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module. The lens driving device may comprise a focus-tunable lens 630.

The camera device 10A may comprise a stator. The stator may be a fixed part when the mover moves. The stator may comprise a second substrate 50. The stator may comprise a base 110. The stator may comprise a housing 210.

The camera device 10A may comprise a mover. The mover may be a part moving against the stator. The mover may comprise a camera module 600. The mover may comprise a holder 310.

The camera device 10A may comprise a driving unit. The driving unit may move the mover against the stator. The driving unit may be disposed above the connection member 430. The driving unit may comprise a plurality of driving units. The driving unit may comprise: a first driving unit for rotating the camera module 600 in a first direction with respect to the stator; a second driving unit for rotating the camera module 600 in a second direction different from the first direction with respect to the stator; a third driving unit for rotating the camera module 600 in a third direction different from the first and second directions with respect to the stator. The driving unit may comprise: a fourth driving unit for moving the focus of the lens 625 in a fourth direction different from the first to third directions, and a fifth driving unit for moving the focus of the lens 625 in a fifth direction different from the first to fourth directions. The fourth driving unit may move the lens 625 in a fourth direction different from the first to third directions. The fifth driving unit may move the lens 625 in a fifth direction different from the first to fourth directions. At this time, the first direction is a direction to rotate about a first axis perpendicular to the optical axis of the image sensor 695, the second direction is a direction to rotate about an optical axis and a second axis perpendicular to the first axis, the third direction may be a direction rotating about the optical axis. The fourth direction may be a direction parallel to the first axis, and the fifth direction may be a direction parallel to the second axis. The first direction is a direction in which the camera module 600 is yawed, the second direction is a direction in which the camera module 600 is pitched, and the third direction may be a direction in which the camera module 600 is rolled.

In the present embodiment, when the camera module 600 is moved by any one or more of the first driving unit, the second driving unit, and the third driving unit, the lens 625 may move together with the image sensor 695 while being aligned with the optical axis. At this time, the case in which the camera module 600 moves may be a case in which the camera module 600 is tilted. In addition, a case in which the camera module 600 moves may be a case in which the camera module 600 is rotated. In addition, a case in which the camera module 600 moves may be a case in which the camera module 600 moves.

The camera module in which the lens 625 and the image sensor 695 are aligned may be tilted about the first axis and the second axis and rotated about the optical axis by the first to third driving units.

Each of the first to third driving units may comprise a coil and a magnet. Each of the fourth and fifth driving units may comprise a coil and a magnet. However, a focus-tunable lens 630 comprising a fourth driving unit and a fifth driving unit may be provided. That is, the focus-tunable lens 630 may move the focus of the lens 625 along a first axis and a second axis. At this time, the first axis may be an x-axis direction and the second axis may be a y-axis direction. As a modified embodiment, the focus-tunable lens 630 may be tilted about the first axis and the second axis. At this time, the first driving unit and the second driving unit may shift the camera module 600 along the first axis and the second axis.

The focus-tunable lens 630 may be tilted about the first axis and the second axis and rotated about an optical axis together with the image sensor 695 by the first to third driving units. The focus-tunable lens 630 may also be tilted in two axes and rotated in one axis together with the camera module 600. That is, when the camera module 600 is tilted in two axes or rotates in one axis, the focus-tunable lens 630 may also move together. The first driving unit may comprise a first magnet 321 and a first coil 221. The second driving unit may comprise a first magnet 321 and a second coil 222. The third driving unit may comprise a second magnet 322 and a third coil 223. As a modified embodiment, the second driving unit may comprise a third magnet separate from the first magnet 321 and the second magnet 322.

The camera device 10A may comprise a base 110. The base 110 may be disposed on the second substrate 50. The base 110 may be disposed on the second substrate 50. The base 110 may be disposed on an upper surface of the second substrate 50. The base 110 may be disposed between housing 210 and the second substrate 50. The base 110 may be coupled to the side plate 520 of the cover 500.

The base 110 may comprise a hole 111. The hole 111 may be a hollow hole. The hole 111 may be an opening. The hole 111 may be formed to penetrate through the base 110 in an optical axis direction. The base 110 may comprise a groove 112. The groove 112 may be formed on an upper surface of the base 110. The groove 112 may be formed at the periphery of the hole 111. An elastic member 120 may be disposed in the groove 112. The depth of the groove 112 may be lower than the height of the protruded part 121-1 of the elastic member 120. Through this, the protruded part 121-1 of the elastic member 120 disposed in the groove 112 may be protruded further than the upper surface of the base 110.

The base 110 may comprise a guide wall 114. The guide wall 114 may be formed to be protruded from an upper surface of the base 110. The guide wall 114 may be formed to be spaced apart from the outer periphery of the base 110. A distance between the guide wall 114 and the outer periphery of the base 110 may correspond to the thickness of the side plate 520 of the cover 500. That is, the side plate 520 of the cover 500 may be disposed on an upper surface of the base 110 between the guide wall 114 and the outer periphery of the base 110. The guide wall 114 may serve as an assembly guide for the side plate 520 of the cover 500, while supporting the inner surface of the side plate 520 of the assembled cover 500. Furthermore, the side plate 520 of the cover 500 may be fixed to an upper surface of the guide wall 114 and/or the base 110 through an adhesive.

The camera device 10A may comprise an elastic member 120. The elastic member 120 may be disposed on the base 110. The elastic member 120 may elastically support the camera module 600. The elastic member 120 may be disposed between the camera module 600 and the base 110. The elastic member 120 may have elasticity at least in part. The elastic member 120 may be formed of metal. The elastic member 120 may comprise a leaf spring.

In order to disperse the stress concentration on the first substrate 690 due to the contact support structure at the center of the lower surface of the camera module 600, an elastic member 120 that is a shock-relieving spring structure may be applied to the contact support structure. That is, the elastic member 120 may relieve stress concentration at a specific point of the first substrate 690 by the preload structure through the upper elastic member 410. In the present embodiment, a shock-relieving spring structure is applied to the support structure of the camera module 600, and thereby, in the case of a drop impact, the stress concentration applied to the first substrate 690 is dispersed so that there is an effect of preventing damage to the image sensor 695.

The elastic member 120 may comprise an inner portion 121. The inner portion 121 may be disposed inside an outer portion 122. The inner portion 121 may comprise a protruded part 1211. The protruded part 1211 may provide a pivot center for a pivot movement of the camera module 600. The protruded part 1211 may be in contact with the camera module 600. The protruded part 1211 may in contact with a lower surface of the camera module 600. The protruded part 1211 may in contact with the first substrate 690. The protruded part 1211 may elastically support the camera module 600. An upper end of the protruded part 1211 may be formed to be round. The protruded part 1211 may comprise a portion having a curvature.

The elastic member 120 may comprise an outer portion 122. The outer portion 122 may be disposed on the base 110. The outer portion 122 may be disposed in the groove 112 of the base 110. The outer portion 122 may be fixed to the base 110 by an adhesive. The outer portion 122 may have a rectangular frame shape.

The elastic member 120 may comprise a connection part 123. The connection part 123 may connect the inner portion 121 and the outer portion 122. The connection part 123 may have elasticity. The connection part 123 may elastically connect the outer portion 122 which is a fixed part and the inner portion 121 which is a movable part. The connection part 123 may comprise a bending or bent part. The connection part 123 may comprise a shape being rounded.

The camera device 10A may comprise a housing 210. The housing 210 may be disposed on the base 110. The housing 210 may be disposed on an upper surface of the base 110. The housing 210 may be disposed below the holder 310. The housing 210 may accommodate a part of the holder 310 and the camera module 600 at an inner side thereof. The housing 210 may comprise a plurality of sidewalls. The housing 210 may comprise four sidewalls. The housing 210 may comprise first to fourth sidewalls. The housing 210 may comprise a first sidewall and a second sidewall disposed opposite to each other, and a third sidewall and a fourth sidewall disposed opposite to each other between the first sidewall and the second sidewall. A coil 220 may be disposed on each of the first to fourth sidewalls of the housing 210.

The housing 210 may comprise a first groove 211. The first groove 211 may be formed in a sidewall of the housing 210. A coil 220 may be disposed in the first groove 211. That is, the first groove 211 may be an 'accommodating groove' for accommodating the coil 220. The first groove 211 may be formed as the upper surface of the housing 210 is being recessed. As a modified embodiment, the first groove 211 may be provided in the form of a hole penetrating the sidewall of the housing 210 in a direction perpendicular to the optical axis. The first groove 211 may comprise a plurality of grooves. The first groove 211 may be formed in each of the four sidewalls of the housing 210.

The housing 210 may comprise a second groove 212. The second groove 212 may be formed in a sidewall of the housing 210. The connection member 430 may pass through the space being formed through the second groove 212. That is, the second groove 212 may be an 'avoiding groove' for avoiding interference with the connection member 430. The second groove 212 may be formed as a lower surface of the housing 210 is being recessed. The second groove 212 may comprise a plurality of grooves. The second groove 212 may be formed in each of one sidewall and the other sidewall of the housing 210.

The housing 210 may comprise a hole. The hole may be formed to penetrate through the housing 210 in a direction parallel to the optical axis. A wire 420 may be disposed in the hole. The hole may be formed with a diameter that does not interfere with the wire 420. The hole may be formed in a corner portion of the housing 210. The hole may comprise a plurality of holes. A hole may be formed in each of the four corner portions of the housing 210. However, as a modified embodiment, the hole may be formed as a groove with a closed bottom. In this case, the lower end of the wire 420 may be fixed to the housing 210.

The camera device 10A may comprise a coil 220. The coil 220 may be disposed in the housing 210. The coil 220 may face the magnet 320. The coil 220 may be coupled to an inner surface of a third substrate 230. The coil 220 may be electrically connected to the third substrate 230. When a current is applied to the coil 220, an electric field may be formed around the coil 220. When a current is applied to the coil 220, one of the coil 220 and the magnet 320 may move relative to the other through electromagnetic interaction between the coil 220 and the magnet 320. In the present embodiment, when a current is applied to the coil 220, the magnet 320 may move. However, in the modified embodiment, the positions of the coil 220 and the magnet 320 may be disposed opposite to each other.

The coil 220 may comprise a first coil 221. The first coil 221 may face the first magnet 321. The first coil 221 may be electrically separated from the second coil 222 and the third coil 223. The first coil 221 may receive current separately from the second coil 222 and the third coil 223. The first coil 221 may be controlled separately from the second coil 222 and the third coil 223. When a current is applied to the first coil 221, no current may be applied to the second coil 222 and the third coil 223. In addition, when a current is applied to the first coil 221, a current may be applied to the second coil 222 and the third coil 223. When no current is applied to the first coil 221, current may be applied to the second coil 222 and the third coil 223. Of course, no current may be applied to all of the first to third coils 221, 222, and 223. That is, the first to third coils 221, 222, and 223 may be individually controlled. The first to third coils 221, 222, and 223 may be independently controlled. In other words, the direction and amount of current applied to each of the first to third coils 221, 222, and 223 may be individually controlled. The first coil 221 may rotate the camera module 600 about a first axis perpendicular to the optical axis through interaction with the magnet 320. The first coil 221 may tilt the camera module 600 about a first axis perpendicular to the optical axis through interaction with the magnet 320. The camera module 600 may be pivotally driven about a first axis perpendicular to the optical axis. At this time, the first axis may be an x-axis.

Figure 17:
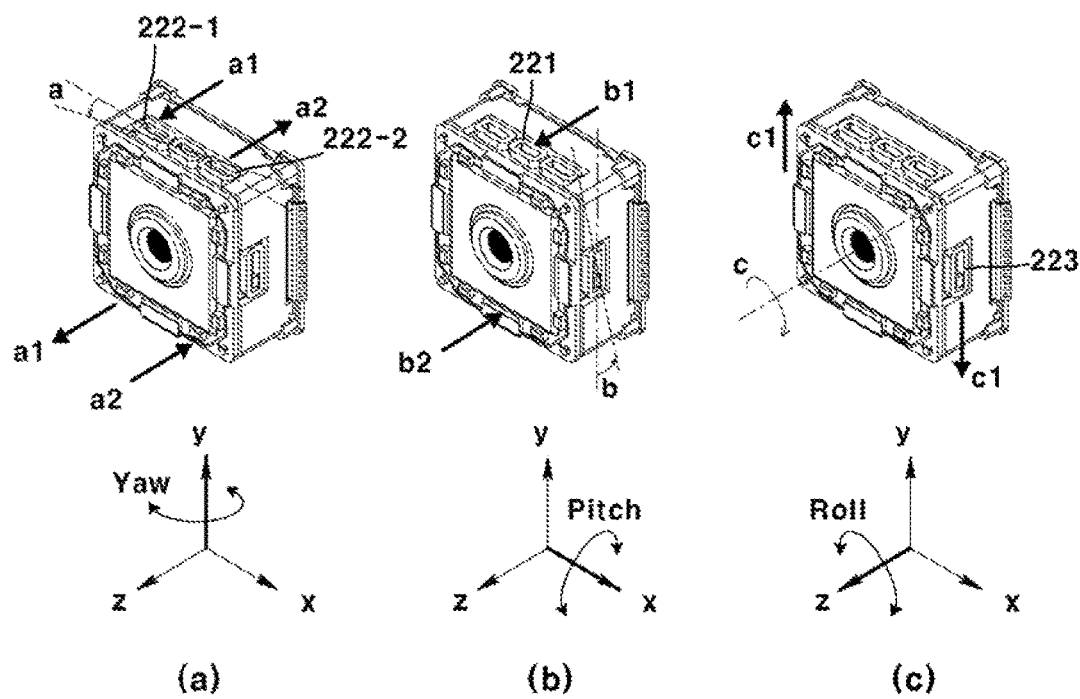
FIG. 17 (a) is a diagram for explaining a yaw driving to one side of a camera module in a camera device according to the present embodiment, FIG. 17 (b) is a diagram for explaining a pitching driving to one side of a camera module, and FIG. 17 (c) is a diagram for explaining the rolling driving to one side of a camera module.

As illustrated in FIG. 17 (*b*), the first coil 221 may rotate (refer to b in FIG. 17 (*b*)) the camera module 600 to one side about the x-axis through interaction with the magnet 320. In more detail, when a forward current is applied to the first-first coil 221-1, an electromagnetic interaction force b1 is generated upwardly between the first-first coil 221-1 and the first-first magnet 321-1, and when a forward current is applied to the first-second coil 221-1, an electromagnetic interaction force b2 is generated downward between the first-second coil 221-1 and the first-second magnet 321-2, so that the camera module 600 may rotate (b) to one side about the x-axis. However, the first-first coil 221-1 and the first-second coil 221-1 are not limited to the same direction current being applied, and in a modified embodiment, currents in different directions can be applied. In addition, reverse currents may be applied to the first-first coil 221-1 and the first-second coil 221-1.

Figure 18:
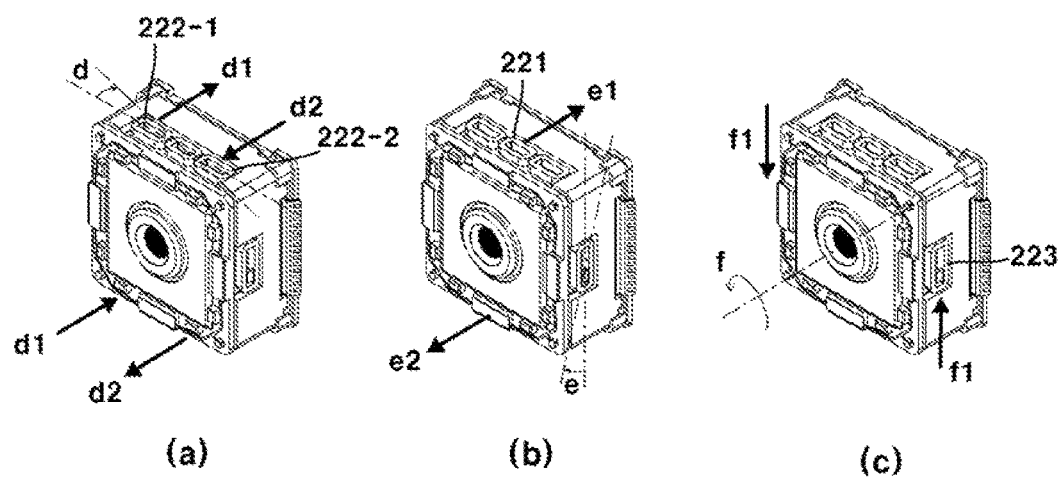
FIG. 18 (a) is a diagram for explaining a yaw driving to the other side of a camera module in a camera device according to the present embodiment, FIG. 18 (b) is a diagram for explaining a pitching driving to the other side of a camera module, and FIG. 18 (c) is a diagram for explaining the rolling driving of a camera module to the other side.
Figure 19:
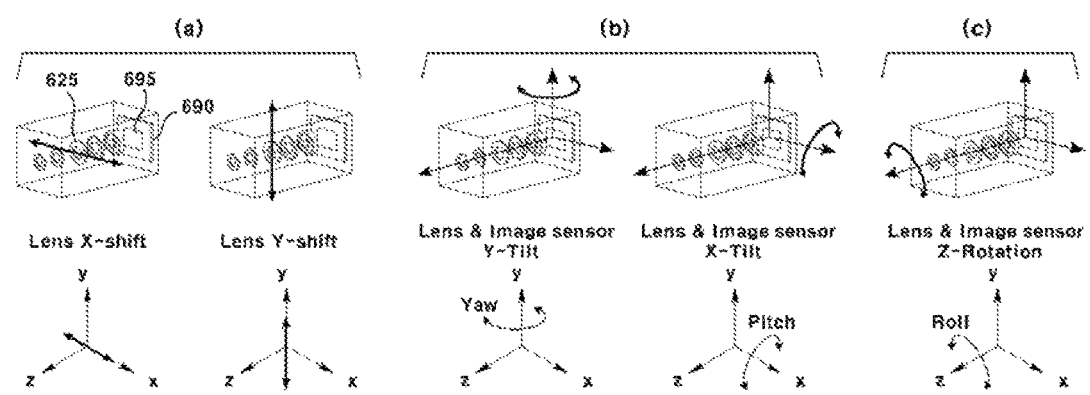
FIG. 19 is a diagram for explaining 5-axis correction of a camera device according to the present embodiment.

As illustrated in FIG. 18 (*b*), the first coil 221 may rotate the camera module 600 to the other side about the x-axis through interaction with the magnet 320 (refer to e in FIG. 18 (*b*)). In more detail, when a reverse current is applied to the first-first coil 221-1, an electromagnetic interaction force e1 is generated downward between the first-first coil 221-1 and the first-first magnet 321-1, and when a current is applied upwardly to the first-second coil 221-1, an electromagnetic interaction force e2 is generated upwardly between the first-second coil 221-1 and the first-second magnet 321-2, so that the camera module 600 can be rotated (e) to the other side about the x-axis.

The first coil 221 may comprise a plurality of coils. The first coil 221 may comprise a first-first coil 221-1 and a first-second coil 221-1. The first-first coil 221-1 may face the first-first magnet 321-1. The first-second coil 221-1 may face the first-second magnet 321-2. The first-first coil 221-1 may be disposed between the second-first coil 222-1 and the second-second coil 222-2. The first-second coil 221-1 may be disposed between the second-third coil 222-3 and the second-second coil 222-4. The first-first coil 221-1 and the first-second coil 221-1 may be electrically connected. Through this, the first-first coil 221-1 and the first-second coil 221-1 can be integrally controlled. However, as another example, the first-first coil 221-1 and the first-second coil 221-1 may be electrically separated. The first-first coil 221-1 and the first-second coil 221-1 may receive current individually. In this case, the first-first coil 221-1 and the first-second coil 221-1 may be individually controlled. That is, the direction and amount of current applied to each of the first-first coil 221-1 and the first-second coil 221-1 may be individually controlled.

The coil 220 may comprise a second coil 222. The second coil 222 may face the first magnet 321. The second coil 222 may be electrically separated from the first coil 221. The second coil 222 and the first coil 221 may receive current individually. The second coil 222 and the first coil 221 may be individually controlled. The second coil 222 may rotate the camera module 600 about an optical axis and a second axis perpendicular to the first axis through interaction with the magnet 320. The second coil 222 may tilt the camera module 600 about an optical axis and a second axis perpendicular to the first axis through interaction with the magnet 320. The camera module 600 may be pivotally driven about an optical axis and a second axis perpendicular to the first axis. At this time, the second axis may be a y-axis.

As illustrated in FIG. 17 (*a*), the second coil 222 may rotate the camera module 600 to one side about a y-axis through interaction with the magnet 320 (refer to a in FIG. 17 (*a*)). In more detail, when a forward current is applied to the second-first coil 222-1, an electromagnetic interaction force a1 is generated upwardly between the second-first coil 222-1 and the first-first magnet 321-1; when a forward current is applied to the second-third coil 222-3, an electromagnetic interaction force a1 is generated upwardly between the second-third coil 222-3 and the first-second magnet 321-2; when a reverse current is applied to the second-second coil 222-2, an electromagnetic interaction force a2 is generated downward between the second-second coil 222-2 and the first-first magnet 321-1; and when a reverse current is applied to the second-fourth coil 222-4, an electromagnetic interaction force a2 is generated downward between the second-fourth coil 222-4 and the first-second magnet 321-2. The camera module 600 may rotate (a) to one side about a y-axis. The electromagnetic interaction force a1 between the second-first coil 222-1 and the first-first magnet 321-1 and the electromagnetic interaction force a1 between the second-third coil 222-3 and the first-second magnet 321-2 faces the same direction; the electromagnetic interaction force a2 between the second-second coil 222-2 and the first-first magnet 321-1 and the electromagnetic interaction force a2 between the second-second coil 222-4 and the first-second magnet 321-2 are directed in the same direction; however, the electromagnetic interaction force a1 between the second-first coil 222-1 and the first-first magnet 321-1 and the electromagnetic interaction force a2 between the second-second coil 222-2 and the first-first magnet 321-1 may face different directions. For example, the electromagnetic interaction force a1 between the second-first coil 222-1 and the first-first magnet 321-1 and the electromagnetic interaction force a1 between the second-third coil 222-3 and the first-second magnet 321-2 is directed upward, and the electromagnetic interaction force a2 between the second-second coil 222-2 and the first-first magnet 321-1 and the electromagnetic force a2 between the second-second coil 222-4 and the first-second magnet 321-2 may be directed downward. Although it has been described that currents in different directions are applied to the second-first coil 222-1 and the second-second coil 222-2, in a modified embodiment, the winding directions of the coils are disposed opposite to each other, and currents in the same direction can be applied.

As illustrated in FIG. 17 (a), the second coil 222 may rotate the camera module 600 to the other side about the y-axis through interaction with the magnet 320 (refer to d in FIG. 17 (a)). In more detail, when a reverse current is applied to the second-first coil 222-1, an electromagnetic interaction force d1 is generated downward between the second-first coil 222-1 and the first-first magnet 321-1; when a reverse current is applied to the second-third coil 222-3, an electromagnetic interaction force d1 is generated downwardly between the second-third coil 222-3 and the first-second magnet 321-2; when a forward current is applied to the second-second coil 222-2, an electromagnetic interaction force d2 is generated upwardly between the second-second coil 222-2 and the first-first magnet 321-1; and when a forward current is applied to the second-fourth coil 222-4, an electromagnetic interaction force d2 is generated upwardly between the second-fourth coil 222-4 and the first-second magnet 321-2. The camera module 600 may rotate (d) to the other side about the y-axis.

The second coil 222 may comprise a plurality of coils. The second coil 222 may comprise second-first to second-fourth coils 222-1, 222-2, 222-3, and 222-4. The second-first coil 222-1 may face the first-first magnet 321-1. The second-first coil 222-1 may be disposed at one side of the first-first coil 221-1. The second-second coil 222-2 may face the first-first magnet 321-1. The second-second coil 222-2 may be disposed at the other side of the first-first coil 221-1. The second-third coil 222-3 may face the first-second magnet 321-2. The second-third coil 222-3 may be disposed at one side of the first-second coil 221-1. The second-fourth coil 222-4 may face the first-second magnet 321-2. The second-fourth coil 222-4 may be disposed on the other side of the first-second coil 221-1.

The second-first to second-fourth coils 222-1, 222-2, 222-3, and 222-4 may be electrically connected. Through this, the second-first to second-fourth coils 222-1, 222-2, 222-3, and 222-4 may be integrally controlled. However, as another example, all of the second-first to second-fourth coils 222-1, 222-2, 222-3, and 222-4 may be electrically separated. In this case, the second-first to second-fourth coils 222-1, 222-2, 222-3, and 222-4 may be individually controlled. That is, the direction and amount of current applied to each of the second-first to second-fourth coils 222-1, 222-2, 222-3, and 222-4 may be individually controlled. As another example, the second-first coil 222-1 and the second-third coil 222-3 are electrically connected; the second-second coil 222-2 and the second-fourth coil 222-4 are electrically connected; and the second-first coil 222-1 and the second-second coil 222-2 may be electrically separated.

The coil 220 may comprise a third coil 223. The third coil 223 may face the second magnet 322. The third coil 223 may be electrically separated from the first coil 221 and the second coil 222. The third coil 223 may receive current separately from any one or more of the first coil 221 and the second coil 222. The third coil 223 may be individually controlled from any one or more of the first coil 221 and the second coil 222.

As illustrated in FIG. 17 (c), the third coil 223 may rotate the camera module 600 to one side about an optical axis through interaction with the magnet 320 (refer to c in FIG. 17 (c)). In more detail, when a forward current is applied to the third-first coil 223-1, an electromagnetic interaction force c1 in a first direction is generated between the third-first coil 223-1 and the second-first magnet 322-1; when a forward current is applied to the third-second coil 223-2, an electromagnetic interaction force c2 is generated in a second direction between the third-second coil 223-2 and the second-second magnet 322-2, so that the camera module 600 may rotate (c) about the z-axis to one side. At this time, the first direction and the second direction are tangential directions of a circle centered about the optical axis, respectively, and may be symmetrical with respect to the optical axis. Although it has been described that the forward current is applied to each of the third-first coil 223-1 and the third-second coil 223-2, in a modified embodiment, currents in different directions may be applied to the third-first coil 223-1 and the third-second coil 223-2. At this time, a necessary electromagnetic interaction force can be induced through the disposement direction of the third-first coil 223-1 and the third-second coil 223-2.

As illustrated in FIG. 17 (c), the third coil 223 may rotate the camera module 600 to the other side about the optical axis through interaction with the magnet 320 (refer to fin FIG. 17 (c)). In more detail, when a reverse current is applied to the third-first coil 223-1, an electromagnetic interaction force f1 is generated in a third direction between the third-first coil 223-1 and the second-first magnet 322-1, and when the reverse current is applied to the third-second coil 223-2, the electromagnetic interaction force 12 is generated in in a fourth direction between the third-second coil 223-2 and the second-second magnet 322-2, so that the camera module 600 may rotate (0 to the other side about a z-axis. At this time, the third and fourth directions are tangential directions of a circle centered on an optical axis, respectively, and may be symmetrical with respect to the optical axis. In addition, the third direction is opposite to the first direction and the fourth direction may be opposite to the second direction.

The third coil 223 may comprise a plurality of coils. The third coil 223 may comprise a third-first coil 223-1 and third-second coil 223-2. The third-first coil 223-1 may face the second-first magnet 322-1. The third-second coil 223-2 may face the second-second magnet 322-2. The third-first coil 223-1 and the third-second coil 223-2 may be electrically connected to each other. Through this, the third-first coil 223-1 and third-second coil 223-2 may be integrally controlled. However, as another example, the third-first coil 223-1 and third-second coil 223-2 may be electrically separated. In this case, the third-first coil 223-1 and third-second coil 223-2 may be individually controlled. That is, the direction and amount of current applied to each of the third-first coil 223-1 and third-second coil 223-2 may be individually controlled.

The camera device 10A may comprise a third substrate 230. The third substrate 230 may be disposed on an outer surface of the housing 210. The third substrate 230 may connect the second substrate 50 and the coil 220. A coil 220 may be coupled to an inner surface of the third substrate 230. A sensor 440 may be coupled to an inner surface of the third substrate 230. A lower end of the third substrate 230 may be coupled to the second substrate 50. The third substrate 230 may be flexible. The third substrate 230 may comprise a flexible printed circuit board (FPCB).

The third substrate 230 may comprise a plurality of substrates. The third substrate 230 may comprise a first-first substrate 230-1 and a first-second substrate 230-2. The first-first substrate 230-1 may be disposed on the first sidewall and the third sidewall of the housing 210. The first-second substrate 230-2 may be disposed on the second sidewall and the fourth sidewall of the housing 210. The first-first substrate 230-1 and the first-second substrate 230-2 may have corresponding shapes. The first-first substrate 230-1 and the first-second substrate 230-2 may be symmetrically disposed with respect to the central axis of the housing 210. Four coils may be coupled to each of the first-first substrate 230-1 and the first-second substrate 230-2. Two sensors may be coupled to each of the first-first substrate 230-1 and the first-second substrate 230-2.

The third substrate 230 may comprise a terminal 231. The terminal 231 may be formed at a lower end of the third substrate 230. The terminal 231 may be coupled to the terminal 50a of the second substrate 50 by soldering. The terminal 231 may comprise a plurality of terminals.

The third substrate 230 may comprise a bent portion 232. The third substrate 230 may comprise a flat plate portion disposed on an outer surface of the housing 210 and a bent portion 232 connecting the two flat plate portions. The bent portion 232 may be formed to be round. The third substrate 230 may have flexibility in the bent portion 232.

The camera device 10A may comprise a holder 310. At least a portion of the holder 310 may be disposed inside the housing 210. A portion of the holder 310 may be disposed above the housing 210. The holder 310 may be coupled to the camera module 600. The camera module 600 may be disposed inside of the holder 310. A magnet 320 may be disposed in the holder 310. The holder 310 may comprise an upper plate and a plurality of sidewalls being extended from the upper plate. A plurality of sidewalls of the holder 310 may be extended along an outer periphery surface of the camera module 600 from the upper plate. The sidewall of the holder 310 may comprise first to fourth sidewalls corresponding to the sidewall of the housing 210.

The holder 310 may comprise a hole 311. The hole 311 may be a hollow hole. The hole 311 may be an opening. The hole 311 may be formed to penetrating through the holder 310 in an optical axis direction. A camera module 600 may be disposed in the hole 311. The hole 311 may be formed in a size corresponding to the camera module 600.

The holder 310 may comprise a protrusion 312. The protrusion 312 may be formed on an upper surface of the holder 310. An upper elastic member 410 may be coupled to the protrusion 312. The protrusion 312 may be formed by being protruded from an upper surface of the upper plate of the holder 310. The protrusion 312 may be formed between corners of the upper plate of the holder 310. The protrusion 312 may comprise a plurality of protrusions. The number of the protrusions 312 may be formed to correspond to the number of the first coupling parts 411 of the upper elastic member 410. The protrusion 312 may comprise four protrusions.

The holder 310 may comprise a stopper 313. The stopper 313 may be formed by being protruded from an upper surface of the holder 310. The stopper 313 may limit the upward movement of the holder 310. The stopper 313 may be an upper stopper. The stopper 313 may be overlapped with the upper plate 510 of the cover 500 in a direction parallel to the optical axis. The stopper 313 may comprise a plurality of protrusions. The stopper 313 may comprise eight protrusions.

The holder 310 may comprise a first hole 314. The first hole 314 may be formed in a sidewall of the holder 310. A magnet 320 may be disposed in the first hole 314. The first hole 314 may be a magnet accommodating hole. The first hole 314 may be formed in a size and shape corresponding to the magnet 320. The first hole 314 may comprise a plurality of holes. The number of first holes 314 may correspond to the number of magnets 320. The first hole 314 may comprise four holes.

The holder 310 may comprise a second hole 315. The second hole 315 may be formed to penetrate through the holder 310 in a direction parallel to the optical axis. The second hole 315 may be formed at a corner of the upper plate of the holder 310. The wire 420 may pass through the second hole 315. The second hole 315 may be formed to have a larger diameter than the wire 420 so as not to interfere with the wire 420. The second hole 315 may comprise a plurality of holes. The number of second holes 315 may correspond to the number of wires 420. The second hole 315 may comprise four holes.

The camera device 10A may comprise a magnet 320. The magnet 320 may be disposed on an outer periphery surface of the camera module 600. The magnet 320 may face the coil 220. The magnet 320 may be disposed to face the coil 220. The magnet 320 may electromagnetically interact with the coil 220. When a current is applied to the coil 220, the magnet 320 may move. The magnet 320 may be a flat magnet having a flat plate shape. The magnet 320 may comprise a plurality of magnets. The magnet 320 may comprise four magnets.

The magnet 320 may comprise a first magnet 321. The first magnet 321 may be disposed on each of the first side surface and the second side surface of the camera module 600. The polarity of the upper and lower portions of the surface of the first magnet 321 facing the coil 220 may be different from each other. The first magnet 321 may be a single magnet having two poles. However, as a modified embodiment, the first magnet 321 may be a bipolar magnetized magnet in which two single magnets having two poles are superimposed. An upper portion of the first magnet 321 may be an N pole and a lower portion may be an S pole. However, in a modified embodiment, an upper portion of the first magnet 321 may be an S pole and a lower portion may be an N pole. The first magnet 321 may face the first coil 221 and the second coil 222. The width of the first magnet 321 in the horizontal direction may correspond to the sum of the width of the first coil 221 and the width of the second coil 222.

The first magnet 321 may comprise a first-first magnet 321-1 and a first-second magnet 321-2. The first-first magnet 321-1 may be disposed on the first side surface of the camera module 600. The first-second magnet 321-2 may be disposed on the second side surface of the camera module 600.

The magnet 320 may comprise a second magnet 322. The second magnet 322 may be disposed on each of the third side surface and the fourth side surface of the camera module 600. The second magnet 322 may have different polarities of the both side portions of the surface facing the coil 220.

The second magnet 322 may be a single magnet having two poles. However, as a modified embodiment, the second magnet 322 may be a bipolar magnetized magnet in which two single magnets having two poles are superimposed. One side portion of the second magnet 322 may be an N pole and the other side portion may be an S pole. However, in a modified embodiment, one side portion of the second magnet 322 may be an S pole and the other side portion may be an N pole. At this time, one side portion may be a portion located on a left side of the second magnet 322, and the other side portion may be a portion located at a right side of the second magnet 322. The second magnet 322 may face the third coil 223. The width of the second magnet 322 in the horizontal direction may be greater than the width of the third coil 223.

The second magnet 322 may comprise a second-first magnet 322-1 and a second-second magnet 322-2. The second-first magnet 322-1 may be disposed on a third side surface of the camera module 600. The second-second magnet 322-2 may be disposed on a fourth side surface of the camera module 600.

The camera device 10A may comprise an upper elastic member 410. A part of the upper elastic member 410 may be coupled to the holder 310. The upper elastic member 410 may be fixed to the protrusion 312 of the holder 310 by an adhesive. The upper elastic member 410 may connect the holder 310 and the wire 420. The upper elastic member 410 may have elasticity at least in part. The upper elastic member 410 may comprise a leaf spring.

As shown in FIGS. 17 and 18, in the present embodiment, a contact support structure may be applied to the center of a lower surface of the camera module 600. At this time, the upper elastic member 410 being provided with a leaf spring is formed to be offset-banded after assembly so as to form a preload structure in which the entire camera module 600 receives a force in the direction of the base 110, thereby preventing posture difference sagging due to gravity. The present embodiment is a structure in which the upper elastic member 410 is offset-banded to apply a preload in a state of product assembly, so in the present embodiment, even if a change in the direction of gravity occurs, the preload, which is the normal drag, is sufficiently large compared to the weight of the camera module 600 therefore the sagging of the camera module 600 according to the posture difference may not occur. Referring to FIG. 15, an offset-bend structure for generating a height difference (refer to a in FIG. 15) existing between the first coupling part 411 and the second coupling part 412 of the upper elastic member 410 can be confirmed. In the present embodiment, the offset bend shape of the upper elastic member 410 may be maintained in all postures in which the camera module 600 photographs above, the camera module 600 photographs below, and the camera module 600 photographs side direction. In other words, the offset bend shape of the upper elastic member 410 may be maintained in all postures in which the lens 625 of the camera module 600 is disposed above an image sensor 695, the lens 625 of the camera module 600 is disposed below the image sensor 695, and the center of the lens 625 of the camera module 600 and the center of the image sensor 695 are disposed at the same height. Through this, the posture difference sagging of the camera module 600 may be prevented. By the preload of the upper elastic member 410, a frictional force F acts between the camera module 600 and the protruded part 1211 of the elastic member 120, and through this, posture difference sagging can be prevented. However, the amount of offset bending of the upper elastic member 410 may be changed according to the posture.

The upper elastic member 410 may comprise a first coupling part 411. The first coupling part 411 may be coupled to the holder 310. The first coupling part 411 may be coupled to an upper surface of the protrusion 312 of the holder 310 by an adhesive. The first coupling part 411 may be formed to have a wider width than the width of the connection part 413.

The upper elastic member 410 may comprise a second coupling part 412. The second coupling part 412 may be connected to the wire 420. The second coupling part 412 may be coupled to the wire 420. The second coupling part 412 may be coupled to the wire 420 by soldering. The second coupling part 412 may comprise a hole through which the wire 420 passes.

The upper elastic member 410 may comprise a connection part 413. The connection part 413 may connect the first coupling part 411 and the second coupling part 412. The connection part 413 may have elasticity. The connection part 413 may elastically connect the first coupling part 411 and the second coupling part 412. The connection part 413 may be integrally formed with the first coupling part 411 and the second coupling part 412.

The camera device 10A may comprise a wire 420. The wire 420 may connect the elastic member 120 and the housing 210 or the elastic member 120 and the base 110. An upper end portion of the wire 420 may be coupled to the second coupling part 412 of the upper elastic member 410. A lower end portion of the wire 420 may be coupled to the base 110. In a modified embodiment, a lower end portion of the wire 420 may be coupled to a lower portion of the housing 210. In a modified embodiment, a lower end portion of the wire 420 may be coupled to the second substrate 50. The wire 420 may pass through the hole of the second coupling part 412 of the upper elastic member 410, the second hole 315 of the holder 310, and the hole of the housing 210. The wire 420 may comprise a wire spring.

In the present embodiment, a rotational force is generated about the X, Y, and Z axes through the electromagnetic interaction of the coil 220 and the magnet 320, and the rigidity against 3-axis rotation is decreased by disposing the upper elastic member 410 being provided as a leaf spring and the wire 420 being provided as a wire spring to be perpendicular to each other, thereby enabling the movement in Yaw, Pitch, and Roll modes. That is, since the rigidity is lowered through the wire 420, in the present embodiment, the current being consumed for 3-axis rotation driving can be reduced.

The wire 420 may comprise a plurality of wires. The wire 420 may comprise four wires. The wire 420 may comprise first to fourth wires. The first to fourth wires may be respectively disposed at four corners of the holder 310.

The camera device 10A may comprise a connection member 430. The connection member 430 may be coupled to the first substrate 690. The connection member 430 may connect the first substrate 690 and the second substrate 50. The connection member 430 may electrically connect the image sensor 695 and the second substrate 50. The connection member 430 may elastically support the movement of the camera module 600. A part of the connection member 430 may move integrally with the camera module 600. The connection member 430 may be flexible. The connection member 430 may comprise a plurality of springs. The connection member 430 may comprise a plurality of elastic members. The connection member 430 may comprise a flexible printed circuit board (FPCB).

The connection member 430 may comprise a first coupling part 431. The first coupling part 431 may be an inner portion. The first coupling part 431 may be coupled to the first substrate 690. The first coupling part 431 may move integrally with the camera module 600. The first coupling part 431 may comprise a substrate. The first coupling part 431 may comprise a first terminal 431-1. The first terminal 431-1 may be connected to the terminal 691 being disposed on a lower surface of the first substrate 690. The first coupling part 431 may comprise a hole. The hole of the first coupling part 431 may be a hollow hole. The protruded part 1211 of the elastic member 120 may be disposed in the hole of the first coupling part 431. The first coupling part 431 may be disposed in a rigid PCB 432-2 of the second coupling part 432. The first coupling part 431 may be connected to the terminal 691 of the first substrate 690. The first terminal 431-1 may be connected to the terminal 691 of the first substrate 690.

The connection member 430 may comprise a second coupling part 432. The second coupling part 432 may be an outer portion. The second coupling part 432 may be fixed to the base 110. The second coupling part 432 may comprise a substrate. The second coupling part 432 may be coupled to the second substrate 50. The second coupling part 432 may comprise a second terminal 432-1. The second terminal 432-1 of the second coupling part 432 may be coupled to the terminal of the second substrate 50 by soldering. The second coupling part 432 may be connected to a terminal of the second substrate 50. The second terminal 432-1 may be connected to the terminal of the second substrate 50.

The connection member 430 may comprise a rigid printed circuit board (RPCB) 432-2 and a flexible printed circuit board (FPCB) 432-3. The RPCB 432-2 may be a rigid PCB 432-2. The FPCB 432-3 may be a flexible PCB 432-3. However, the rigid PCB 432-2 and the flexible PCB 432-3 may be formed separately from the substrate of the second coupling part 432. A rigid PCB 432-2 can be coupled with a plurality of springs. The flexible PCB 432-3 is connected to the rigid PCB 432-2 and may comprise a second terminal 432-1. In another embodiment, RPCB 432-2 and FPCB 432-3 may be formed as a substrate.

The connection member 430 may comprise a connection part 433. The connection part 433 may connect the first coupling part 431 and the second coupling part 432. The connection part 433 may be bent at least in part. The connection part 433 may be flexible. The connection part 433 may be flexible. The connection part 433 may have elasticity. The connection part 433 may elastically connect the first coupling part 431 and the second coupling part 432.

One end of the connection part 433 may be coupled to the first coupling part 431. One end of the connection part 433 may be coupled to the terminal 691 of the first substrate 690. One end of the connection part 433 may be soldered to the terminal 691 of the first substrate 690. One end of the connection part 433 may be soldered to the terminal 691 of the first substrate 690. One end of the connection part 433 may be electrically connected to the terminal 691 of the first substrate 690.

The other end of the connection part 433 may be coupled to the second coupling part 432. The other end of the connection part 433 may be coupled to the RPCB 432-2. The other end of the connection part 433 may be soldered to the RPCB 432-2. The other end of the connection part 433 may be soldered to the RPCB 432-2. The other end of the connection part 433 may be electrically connected to the RPCB 432-2 and the FPCB 432-3. Through this, the other end of the connection part 433 may be electrically connected to the second substrate 50.

The connection part 433 may comprise a plurality of springs spaced apart from each other. The plurality of springs may comprise 28 springs. Each of the plurality of springs may comprise a shape that is bent at least twice. Each of the plurality of springs may comprise a shape that is bent three times. Each of the plurality of springs may comprise a shape bent at 90 degrees. Each of the plurality of springs may comprise a shape that is bent three or more times by 90 degrees. In the present embodiment, the image sensor 695 and the second substrate 50 may be electrically conducted through a plurality of springs. In the present embodiment, a plurality of springs are used so that the reaction force generated when the camera module 600 is rolled is reduced compared to when a PCB is used, so the current consumption can also be reduced.

The connection part 433 may comprise a plurality of conducting wires having an elastic force. The connection part 433 has elasticity and may be formed of a material to which current is supplied. The connection part 433 may be divided into four parts or regions comprising corresponding shapes. One part of the four parts may comprise seven springs.

In the present embodiment, a metal spring having a thickness of 30 μm and a width of 30 μm may be applied to each of the plurality of springs. Through this, not only the electrical connection of 20 to 30 image sensors 695 but also implementation of module-tilt OIS module capable of 3-axis hand-shake compensation that can drive X-tilt, Y-tilt, and Z-rotation become possible.

In the present embodiment, it is possible to reduce the dispersion of the rigidity of the spring compared to the PCB type by applying the metal spring of the etching method.

The camera device 10A may comprise a sensor 440. The sensor 440 may be disposed on an inner surface of the third substrate 230. The sensor 440 may comprise a Hall sensor (Hall IC). The sensor 440 may detect a magnetic force of the magnet 320. The movement of the camera module 600 may be detected in real time through the magnetic force of the magnet 320 detected by the sensor 440. Through this, OIS feedback control may be possible.

The sensor 440 may comprise a plurality of sensors. The sensor 440 may comprise four sensors. All of the yawing, pitching, and rolling of the camera module 600 may be detected through the four sensors. The sensor 440 may comprise first to fourth sensors. The first sensor and the second sensor face the first-first magnet 321-1, the third sensor faces the second-first magnet 322-1, and the fourth sensor may face the first-second magnet 321-2.

The sensor 440 may comprise a first Hall sensor that detects the movement amount and/or displacement of the magnet 320 in an x-axis direction. The sensor 440 may comprise a second Hall sensor that detects the movement amount and/or displacement of the magnet 320 in a y-axis direction. The sensor 440 may comprise a third Hall sensor that detects the movement amount and/or displacement of the magnet 320 in a z-axis direction. Yawing, pitching, and rolling of the camera module 600 may be detected through any two or more of the first Hall sensor, the second Hall sensor, and the third Hall sensor.

The camera device 10A may comprise a cover 500. The cover 500 may comprise a 'cover can'. The cover 500 may be disposed to surround the holder 310 and the housing 210. The cover 500 may be coupled to the base 110. The cover 500 may accommodate the camera module 600 therein. The cover 500 may form an outer appearance of the camera device 10A. The cover 500 may have a hexahedral shape with an open lower surface. The cover 500 may be a non-magnetic material. The cover 500 may be formed of metal. The cover 500 may be formed of a metal plate. The cover 500 may be connected to the ground portion of the second substrate 50. Through this, the cover 500 may be grounded. The cover 500 may block electromagnetic interference (EMI). At this time, the cover 500 may be referred to as an 'EMI shield can'. The cover 500 may comprise an upper plate 510 and a side plate 520. The cover 500 may comprise an upper plate 510 comprising a hole, and a side plate 520 being extended downward from an outer periphery or edge of the upper plate 510. A lower end of the side plate 520 of the cover 500 may be disposed on the base 110. The inner surface of the side plate 520 of the cover 500 may be fixed to the base 110 by an adhesive.

The side plate 520 of the cover 500 may comprise a plurality of side plates. The plurality of side plates may comprise first to fourth side plates. The side plate 520 of the cover 500 may comprise a first side plate and a second side plate disposed opposite to each other, and a third side plate and a fourth side plate being disposed at an opposite sides between the first side plate and the second side plate.

The camera device 10A may comprise a camera module 600. The camera module 600 may comprise a lens driving device. The camera module 600 may comprise a focus-tunable lens 630. As a modified embodiment, the camera module 600 may comprise a voice coil motor (VCM). Or, the camera module 600 may comprise both a focus-tunable lens 630 and a voice coil motor. The camera module 600 may be disposed inside the housing 210. The camera module 600 may be disposed in the protruded part 1211 of the elastic member 120. The camera module 600 may pivot about the protruded part 1211 of the elastic member 120. The camera module 600 may be coupled to the holder 310. The camera module 600 may move integrally with the holder 310. A magnet 320 may be disposed on an outer periphery surface of the camera module 600. The camera module 600 may be yawed. The camera module 600 may be rotated, tilted, moved or pivoted in a yaw direction. The camera module 600 may be pitched. The camera module 600 may be rotated, tilted, moved or pivoted in a pitch direction. The camera module 600 may be rolled. The camera module 600 may be rotated, tilted, moved or pivoted in a roll direction.

The camera module 600 may comprise first to fourth side surfaces. The outer periphery surface of the camera module 600 may comprise a first side surface and a second side surface disposed opposite to each other, and a third side surface and a fourth side surface disposed opposite to each other between the first side surface and the second side surface.

The camera module 600 may comprise a cover 610. The cover 610 may comprise a 'cover can'. The cover 610 may be disposed to surround the holder 620. The cover 610 may be coupled to the base 660. The cover 610 may form an outer appearance of the camera module 600. The cover 610 may have a hexahedral shape with an open lower surface. The cover 610 may be a non-magnetic material. The cover 610 may be formed of metal. The cover 610 may be formed of a metal plate. The cover 610 may be connected to the ground portion of the first substrate 690. Through this, the cover 610 may be grounded. The cover 610 may block electromagnetic interference (EMI). At this time, the cover 610 may be referred to as an 'EMI shield can'.

The cover 610 may comprise an upper plate 611 and a side plate 612. The cover 610 may comprise an upper plate 611 comprising a hole, and a side plate 612 being extended downward from an outer periphery or edge of the upper plate 611. A lower end of the side plate 612 of the cover 610 may be disposed on the base 660. An inner surface of the side plate 612 of the cover 610 may be fixed to the base 660 by an adhesive. The side plate 612 of the cover 610 may comprise a plurality of side plates. The plurality of side plates may comprise first to fourth side plates. The side plate 612 of the cover 610 may comprise a first side plate and a second side plate disposed opposite to each other, and a third side plate and a fourth side plate being disposed at an opposite side from each other between the first side plate and the second side plate. The camera module 600 may comprise a holder 620. The holder 620 may be disposed inside the cover 610. The holder 620 may be disposed on the base 660.

The holder 620 may accommodate the lens 625 therein. The holder 620 may comprise a lens barrel. The holder 620 may accommodate the focus-tunable lens 630 therein. The holder 620 may comprise a hole penetrating through the holder 620 in a horizontal direction. At this time, the focus-tunable lens 630 may be disposed by being inserted into a hole formed in the holder 620.

The camera module 600 may comprise a lens 625. The lens 625 may comprise a plurality of lenses. The lens 625 may be described as a solid lens to distinguish it from a liquid lens. The lens 625 may be disposed inside the holder 620. The plurality of lenses may comprise five lenses. The plurality of lenses may comprise first to fifth lenses. A focus-tunable lens 630 may be disposed between the plurality of lenses. The focus-tunable lens 630 may be disposed between the second lens and the third lens. The focus-tunable lens 630 may be a liquid lens.

The camera module 600 may comprise a focus-tunable lens 630. The lens 625 may comprise a focus-tunable lens 630. The focus-tunable lens 630 may be a lens whose focus is being adjusted. The focus may be adjusted by moving the lens and/or changing the shape of the lens. The focus may be adjusted by changing the shape of an interface formed between two types of liquids comprising the focus-tunable lens 630. The focus-tunable lens 630 may move a focus along a first axis and a second axis. At this time, the first axis may be an x-axis and the second axis may be a y-axis. That is, the focus-tunable lens 630 may perform the effect of shifting the lens 625 in an x-axis direction and/or the effect of shifting the lens 625 in a y-axis direction.

The focus-tunable lens 630 may be electrically connected to the second substrate 50. The camera module 600 may comprise a conductive line for electrically connecting the focus-tunable lens 630 to the second substrate 50. At this time, the conductive line may be integrally formed in the configuration of the holder 620 or the like through a molded interconnection device (MID) method. Or, it may be formed as a separate terminal and disposed in the holder 620. The focus-tunable lens 630 may be electrically connected to the second substrate 50 through the first substrate 690 and the connection member 430.

The focus-tunable lens 630 may comprise a liquid lens. The liquid lens may be disposed between the plurality of lenses. The liquid lens may be disposed in the solid lens. The liquid lens may be disposed to be aligned with the solid lens. The liquid lens whose focal length is being adjusted in response to the driving voltage may receive an operating voltage through an upper terminal. The upper terminal of the liquid lens may comprise four individual terminals. When an operating voltage is applied through the upper terminal, the interface between the conductive liquid and the non-conductive liquid formed in the lens region may be deformed. The lower terminal may be a common terminal. The upper terminal may be an upper electrode. A lower terminal may be a lower electrode. The liquid lens may be spaced apart from the solid lens. An epoxy may be applied through the space between the liquid lens and the solid lens, and active alignment of the liquid lens may be performed. At this time, active alignment operates a liquid lens and may refer to a process of aligning the liquid lens to the image sensor 695. Or, the active alignment may refer to a process of operating a liquid lens and aligning the liquid lens to a solid lens.

The focus-tunable lens may comprise at least one among a liquid lens, a polymer lens, a liquid crystal lens, a voice coil motor (VCM) actuator, a shape memory alloy (SMA) actuator, and a micro electro mechanical systems (MEMS) actuator. The liquid lens may comprise at least one among a liquid lens containing one type of liquid and a liquid lens containing two types of liquid. A liquid lens comprising one type of liquid may change the focus by adjusting a membrane disposed at a position corresponding to the liquid. For example, the focus can be changed by pressing the membrane by the electromagnetic force of the magnet and coil. A liquid lens comprising two types of liquids may comprise a conductive liquid and a non-conductive liquid. In this case, the focus may be changed by adjusting the interface between the conductive liquid and the non-conductive liquid using a voltage applied to the liquid lens. The polymer lens can change the focus by controlling a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising the solid lens through electrostatic force generated when voltage is applied.

As a modified embodiment, the camera module 600 may comprise an AF coil, an OIS coil, and an AF/OIS magnet. The AF coil and the OIS coil may be formed in common, and the AF/OIS magnet may be formed separately. In this case, the OIS coil may shift the lens 625 in an x-axis direction through interaction with the magnet. The OIS coil may shift the lens 625 in the y-axis direction through interaction with the magnet.

The camera module 600 may comprise a housing, a bobbin being disposed inside the housing and being coupled to the lens 625, a base 660 being disposed below the bobbin, a first coil being disposed in the bobbin, a first coil being disposed in the housing, a magnet facing the coil, and a second coil being disposed on the base 660 and facing the magnet. The second coil may shift the housing, the bobbin, and the lens 625 in an x-axis direction and a y-axis direction through interaction with the magnet. The camera module 600 may comprise an elastic member connecting the bobbin and the housing, a substrate being disposed on the base 660 and comprising a second coil, and a wire connecting the elastic member and the substrate. The second coil of the camera module 600 may be an OIS coil. The OIS coil may comprise an OIS-X coil that moves the magnet in an x-axis direction and an OIS-Y coil that moves the magnet in a y-axis direction. The fourth driving unit of the present embodiment may comprise an OIS-X coil and a magnet. The fifth driving unit of the present embodiment may comprise an OIS-Y coil and a magnet.

The camera module 600 may comprise a focus-tunable lens holder 640. The focus-tunable lens holder 640 may accommodate the focus-tunable lens 630 therein. That is, the focus-tunable lens 630 may be disposed inside the focus-tunable lens holder 640. The focus-tunable lens holder 640 may be disposed at a circumference of the focus-tunable lens 630.

The camera module 600 may comprise first and second substrates 651 and 652. The first and second substrates 651 and 652 may electrically connect the focus-tunable lens 630 and the first substrate 690 to each other. A portion of the first substrate 651 may be coupled to an upper surface of the focus-tunable lens 630. A portion of the second substrate 652 may be coupled to a lower surface of the focus-tunable lens 630. The camera module 600 may comprise a base 660. The base 660 may be disposed in the first substrate 690. The base 660 may be disposed between the first substrate 690 and the holder 620. The camera module 600 may comprise a spacer 670. The spacer 670 may be disposed between the holder 620 and the base 660.

The camera module 600 may comprise a filter 680. The filter 680 may serve to block light of a specific frequency band from being incident on the image sensor 695 in light passing through the lens 625. The filter 680 may be disposed to be parallel to an x-y plane. A filter 680 may be disposed between the lens 625 and the image sensor 695. The filter 680 may be disposed on the base 660. The filter 680 may be disposed on a bottom surface of a groove formed on a lower surface of the base 660. The filter 680 may comprise an infrared filter. The infrared filter may block light in the infrared region from being incident on the image sensor 695.

The camera module 600 may comprise a first substrate 690. An image sensor 695 may be disposed in the first substrate 690. The first substrate 690 may be a sensor substrate. The first substrate 690 may be a rigid printed circuit board (PCB). The first substrate 690 may be disposed below the base 660. The first substrate 690 may be disposed in the protruded part 1211 of the elastic member 120. The first substrate 690 may be coupled to the connection member 430. The first substrate 690 may be electrically connected to the second substrate 50 through the connection member 430.

The camera module 600 may comprise an image sensor 695. The image sensor 695 may have a configuration in which light passing through the lens 625 and the filter 680 is incident to form an image. The image sensor 695 may be disposed in the first substrate 690. The image sensor 695 may be electrically connected to the first substrate 690. For example, the image sensor 695 may be coupled to the first substrate 690 by a surface mounting technology (SMT). The image sensor 695 may be disposed such that the lens 625 and the optical axis coincide with each other. That is, the optical axis of the image sensor 695 and the optical axis of the lens 625 may be aligned. The image sensor 695 may convert light irradiated to the effective image area of the image sensor 695 into an electrical signal. The image sensor 695 may be any one among a charge coupled device (CCD), a metal oxide semi-conductor (MOS), a CPD, and a CID.

The camera device 10A according to the present embodiment is a structure capable of 3-axis hand-shake correction by adding roll compensation, which is a Z-axis rotation mode, to the 2-axis compensation module tilt method, so that photographing of high-quality video becomes possible by minimizing the effect of hand-shake during video recording. Therefore, the camera device 10A according to the present embodiment may be applied to a camcorder, an action camera, and the like as well as a smartphone.

The camera device 10A according to the present embodiment has a structure similar to the lens shift type OIS VCM and an existing method can be utilized in the assembly process.

The present embodiment may comprise a structure in which a metal leaf spring comprised of several patterns is connected to the first substrate 690 of the camera module 600 to simultaneously perform the electrical connection of the image sensor 695 and the role of a spring.

In more detail, a terminal 691 that is an output pad is formed on a lower surface of the first substrate 690, and an output pad and a metal spring pattern are respectively connected to the second substrate 50 may be connected to an image sensor signal. At this time, each of the metal spring patterns is electrically independent, and when X-tilt, Y-tilt, and Z-roll are driven, they can act as a spring reaction force that can move.

The present embodiment can implement 5-axis handshake correction as illustrated in FIG. 19. X-axis shift and Y-axis shift are performed using the lens shift method, and tilting about an X-axis, tilting about a Y-axis, and tilting about a Z-axis can be performed using the module tilt method. FIG. 19 (a) is a lens shift method and illustrates performing X-axis shift and Y-axis shift. FIG. 19 (b) is a module tilt method and illustrates tilting about an X-axis and tilting about a Y-axis. FIG. 19 (c) is a module tilt method and illustrates tilting about a tilting about a Z-axis.

In the present embodiment, according to the application of the module tilt OIS method, high-quality photos and videos can be photographed by correcting not only the central part of the image but also the peripheral shakes without distortion when photographing photos and videos. Through the present embodiment, high-quality photos and videos can be obtained by implementing the 5-axis OIS function that can correct all types of hand-shake that occur during photographing with a camera.

As another embodiment, the camera device comprises: a first substrate 690 and an image sensor 695 being disposed on the first substrate 690; a camera module 600 comprising a lens 625 being disposed at a position corresponding to the image sensor 695; a first driving unit for moving the camera module 600 in a first direction; a second driving unit for moving the camera module 600 in a second direction; and a third driving unit for rotating the camera module 600 in a third direction, wherein the camera module 600 may comprise a fourth driving unit for tilting the lens 625 in a fourth and fifth directions. The camera module 600 may comprise a fourth driving unit for tilting the lens 625 in a fourth direction and a fifth driving unit for tilting the lens 625 in a fifth direction. The tilting in a fourth direction and the tilting in a fifth direction of the lens 625 may be performed by a liquid lens.

Hereinafter, an optical device according to the present embodiment will be described with reference to the drawings.

Figure 20:
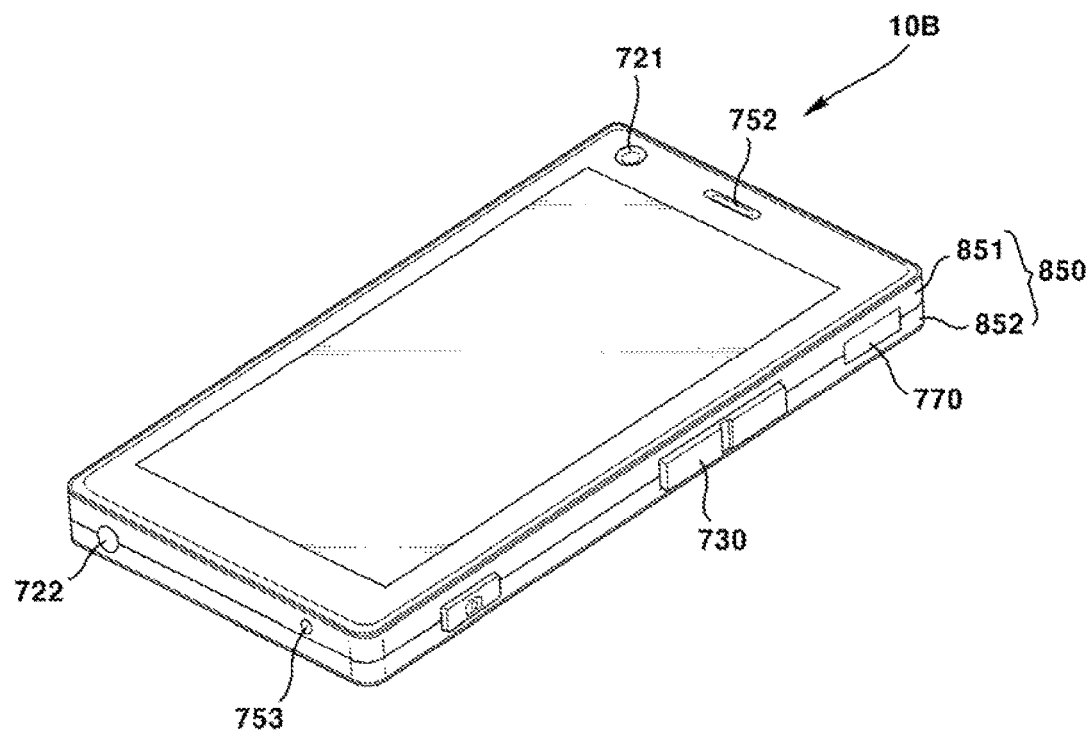
FIG. 20 is a perspective view of an optical device according to the present embodiment.
Figure 21:
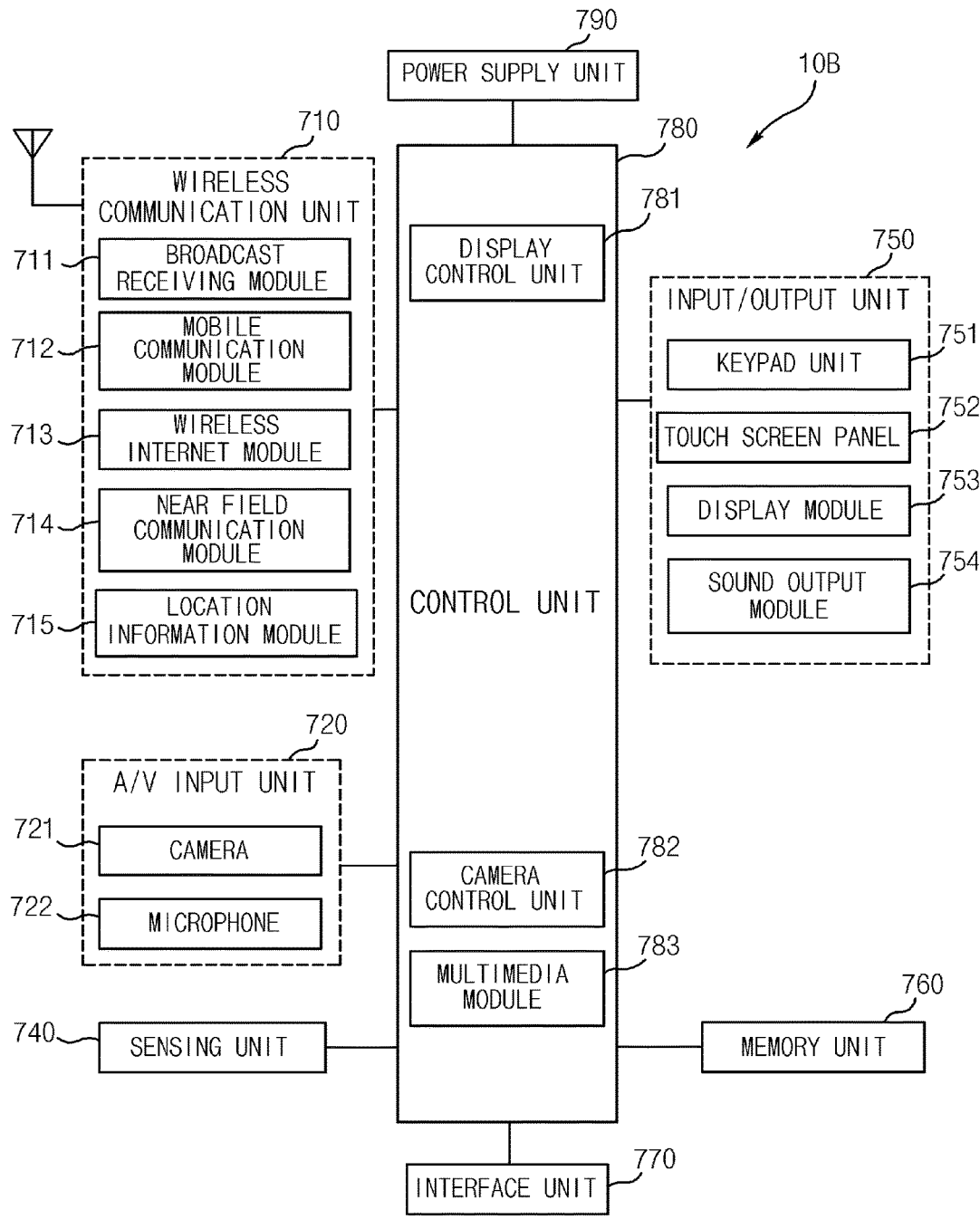
FIG. 21 is a block diagram of an optical device illustrated in FIG. 20.

FIG. 20 is a perspective view of an optical device according to the present embodiment, and FIG. 21 is a block diagram of an optical device illustrated in FIG. 20.

The optical device may be any one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for photographing an image or a picture may be comprised in the optical device 10B.

The optical device 10B may comprise a main body 850. The main body 850 may have a bar shape. Or, the main body 850 may have various structures, such as a slide type, a folder type, a swing type, a swivel type, in which two or more sub-bodies are coupled to be movable relative to each other. The main body 850 may comprise a case (casing, housing, and cover) forming an outer appearance. For example, the main body 850 may comprise a front case 851 and a rear case 852. Various electronic components of the optical device 10B may be embedded in a space formed between the front case 851 and the rear case 852. A display 751 may be disposed on one surface of the main body 850. A camera 721 may be disposed on one or more surfaces among one surface of the main body 850 and the other surface being disposed opposite to the one surface.

The optical device 10B may comprise a wireless communication unit 710. The wireless communication unit 710 may comprise one or more modules that enable wireless communication between the optical device 10B and a wireless communication system or between the optical device 10B and a network in which the optical device 10B is located. For example, the wireless communication unit 710 may comprise any one or more among a broadcast receiving module 711, a mobile communication module 712, a wireless Internet module 713, a near field communication module 714, and a location information module 715.

The optical device 10B may comprise an A/V input unit 720. The A/V (Audio/Video) input unit 720 is for inputting an audio signal or a video signal, and may comprise any one or more among a camera 721 and a microphone 722. At this time, the camera 721 may comprise a camera device 10A according to the present embodiment.

The optical device 10B may comprise a sensing unit 740. The sensing unit 740 may generate a sensing signal for controlling the operation of the optical device 10B by detecting the current state of the optical device such as open/close state of the optical device 10B, location of the optical device 10B, user contact, orientation of the optical device 10B, and acceleration and deceleration of the optical device 10B. For example, when the optical device 10B is in the form of a slide phone, it is possible to detect whether the slide phone is opened or closed. In addition, it may be responsible for sensing functions related to whether the power supply unit 790 is supplied with power, whether the interface unit 770 is coupled to an external device, and the like.

The optical device 10B may comprise an input/output unit 750. The input/output unit 750 may be configured to generate an input or output related to visual, auditory, or tactile sense. The input/output unit 750 may generate input data for controlling the operation of the optical device 10B, and may output information processed by the optical device 10B.

The input/output unit 750 may comprise any one or more of a keypad unit 730, a display 751, a sound output module 752, and a touch screen panel 753. The keypad unit 730 may generate input data in response to a keypad input. The display 751 may output an image photographed by the camera 721. The display 751 may comprise a plurality of pixels whose color changes according to an electrical signal. For example, the display 751 may comprise at least one among a liquid crystal display, a thin film transistor-liquid crystal display, an organic light-emitting diode, a flexible display, and a 3D display. The sound output module 752 outputs audio data being received from the wireless communication unit 710 in a call signal reception, a call mode, a recording mode, a voice recognition mode, or a broadcast receiving mode, or audio data stored in the memory unit 760, and the like. The touch screen panel 753 may convert a change in capacitance generated due to a user's touch on a specific area of the touch screen into an electrical input signal.

The optical device 10B may comprise a memory unit 760. A program for processing and control of the control unit 780 may be stored in the memory unit 760. In addition, the memory unit 760 may store input/output data, for example, any one or more among a phone book, a message, an audio, a still image, a photo, and a video. The memory unit 760 may store an image photographed by the camera 721, for example, a photo or a video.

The optical device 10B may comprise an interface unit 770. The interface unit 770 serves as a path for connecting to an external device connected to the optical device 10B. The interface unit 770 may receive data from an external device, receive power and transmit it to each component inside the optical device 10B, or transmit data inside the optical device 10B to an external device. The interface unit 770 The interface unit 770 may comprise any one or more among: a wired/wireless headset port; an external charger port, a wired/wireless data port; a memory card port; a port for connecting a device equipped with an identification module; an audio input/output (I/O) port; a video input/output (I/O) port; and an earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a multimedia module 781 for playing multimedia. The multimedia module 781 may be provided inside the control unit 180 or may be provided separately from the control unit 780. The control unit 780 may perform a pattern recognition process capable of recognizing a handwriting input or a drawing input performed on the touch screen as characters and images, respectively.

The optical device 10B may comprise a power supply unit 790. The power supply unit 790 may receive external power or internal power by the control of the control unit 780 to supply power required for operation of each component.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera device comprising:
a camera module comprising a first substrate, an image sensor disposed on the first substrate, and a lens disposed at a position corresponding to the image sensor;
a first driving unit configured to rotate the camera module about a first axis perpendicular to an optical axis of the image sensor;
a second driving unit configured to rotate the camera module about a second axis perpendicular to the first axis and the optical axis; and
a third driving unit configured to rotate the camera module about the optical axis,
wherein the camera module in a state in which the lens and the image sensor are aligned is configured to be tilted about the first axis and the second axis and rotated about the optical axis by the first to third driving units,
wherein the camera module comprises a first side surface and a second side surface disposed opposite to each other, and a third side surface and a fourth side surface disposed opposite to each other,
wherein the first driving unit and the second driving unit comprise a first magnet comprising a first-first magnet disposed on the first side surface of the camera module, and a first-second magnet disposed on the second side surface of the camera module,
wherein the first driving unit comprises a first coil comprising a first-first coil facing the first-first magnet and a first-second coil facing the first-second magnet,
wherein the second driving unit comprises a second coil comprising a second-first coil and a second-second coil, each facing the first-first magnet, and a second-third coil and a second-fourth coil, each facing the first-second magnet,
wherein the first-first coil is disposed between the second-first coil and the second-second coil,
wherein the first-second coil is disposed between the second-third coil and the second-fourth coil, and
wherein the third driving unit comprises a second magnet disposed on each of the third and fourth side surfaces of the camera module and a third coil facing the second magnet.

2. The camera device of claim 1, wherein the camera module comprises a focus-tunable lens,
wherein the focus-tunable lens together with the image sensor is configured to be tilted about the first axis and the second axis and rotated about the optical axis by the first to third driving units, and
wherein the focus-tunable lens is configured to move a focus along the first axis and the second axis.

3. The camera device of claim 2, wherein the lens of the camera module comprises a plurality of lenses, and
wherein the focus-tunable lens comprises a liquid lens disposed between the plurality of lenses.

4. The camera device of claim 1, comprising a second substrate,
wherein the first substrate and the second substrate are connected by a connection member,
wherein the connection member comprises a first coupling part comprising a first terminal connected to a terminal of the first substrate, a second coupling part comprising a second terminal connected to a terminal of the second substrate, and a connection part connecting the first coupling part and the second coupling part, and
wherein the connection part comprises a plurality of springs spaced apart from each other.

5. The camera device of claim 4, wherein the second coupling part comprises a rigid printed circuit board (RPCB) connected to the plurality of springs, and a flexible printed circuit board (FPCB) connected to the RPCB and comprising the second terminal,
wherein the first coupling part is disposed in the RPCB of the second coupling part, and
wherein the plurality of springs comprises 28 springs.

6. The camera device of claim 1, comprising a second substrate, and a base disposed on the second substrate,
wherein an elastic member is disposed between the base and the camera module, and
wherein the elastic member comprises an inner portion comprising a protrusion contacted with the camera module, an outer portion disposed on the base, and a connection part connecting the inner portion and the outer portion.

7. The camera device of claim 1, comprising:
a base disposed below the camera module;
a housing disposed on the base;
a holder disposed in the housing and coupled to the camera module;
an upper elastic member connecting the holder and the housing; and
a plurality of wires connecting the upper elastic member and the base.

8. The camera device of claim 1, wherein the camera module comprises:
a base;
a housing disposed on the base;
a bobbin disposed in the housing and coupled to the lens;
an auto-focus (AF) coil disposed on the bobbin;
a magnet disposed on the housing and facing the AF coil; and
an optical image stabilization (OIS) coil disposed on the base and facing the magnet.

9. The camera device of claim 8, wherein, when the lens moves by at least one of the AF coil and the OIS coil, the lens is configured to move separately from the image sensor.

10. The camera device of claim 1, wherein the first magnet has different polarities on upper and lower portions of an outer side surface thereof, and
wherein the second coil is configured to receive a current separately from the first coil.

11. The camera device of claim 1, wherein the second magnet comprises a second-first magnet disposed on the third side surface of the camera module and a second-second magnet disposed on the fourth side surface of the camera module, and
wherein the third coil comprises a third-first coil facing the second-first magnet and a third-second coil facing the second-second magnet.

12. The camera device of claim 1, wherein the second magnet has different polarities on both side portions of an outer side surface thereof, and
wherein the third coil is configured to receive current separately from the first coil and the second coil.

13. The camera device of claim 1, wherein an electromagnetic interaction force is generated upwardly between the first-first coil and the first-first magnet when a forward current is applied to the first-first coil and an electromagnetic interaction force is generated downward between the first-second coil and the first-second magnet when a forward current is applied to the first-second coil so that the camera module rotates to one side about the first axis.

14. The camera device of claim 1, wherein an electromagnetic interaction force is generated upwardly between the second-first coil and the first-first magnet when a forward current is applied to the second-first coil and an electromagnetic interaction force is generated downward between the second-second coil and the first-first magnet when a reverse current is applied to the second-second coil so that the camera module rotates to one side about the second axis.

15. An optical device comprising:
a main body;
the camera device of claim 1 disposed on the main body; and
a display disposed on the main body and configured to output an image photographed by the camera device.

16. A camera device comprising:
a stator;
a camera module comprising a first substrate, an image sensor disposed on the first substrate, and a lens disposed at a position corresponding to the image sensor;
a first driving unit configured to rotate the camera module in a first direction with respect to the stator;
a second driving unit configured to rotate the camera module in a second direction different from the first direction with respect to the stator;
a third driving unit configured to rotate the camera module in a third direction different from the first and second directions with respect to the stator;
wherein the camera module in a state in which the lens and the image sensor are aligned is configured to be rotated by the first to third driving units,
wherein the camera module comprises a first side surface and a second side surface disposed opposite to each other, and a third side surface and a fourth side surface disposed opposite to each other,
wherein the first driving unit and the second driving unit comprise a first magnet comprising a first-first magnet disposed on the first side surface of the camera module, and a first-second magnet disposed on the second side surface of the camera module,
wherein the first driving unit comprises a first coil comprising a first-first coil facing the first-first magnet and a first-second coil facing the first-second magnet,
wherein the second driving unit comprises a second coil comprising a second-first coil and a second-second coil, each facing the first-first magnet, and a second-third coil and a second-fourth coil, each facing the first-second magnet,
wherein the first-first coil is disposed between the second-first coil and the second-second coil,
wherein the first-second coil is disposed between the second-third coil and the second-fourth coil, and
wherein the third driving unit comprises a second magnet disposed on each of the third and fourth side surfaces of the camera module and a third coil facing the second magnet.

17. The camera device of claim 16, wherein the first direction is a direction rotating about a first axis perpendicular to an optical axis of the image sensor,
wherein the second direction is a direction rotating about a second axis perpendicular to the optical axis and the first axis, and
wherein the third direction is a direction rotating about the optical axis.

18. The camera device of claim 16, wherein the first direction is a direction in which the camera module is yawed,
wherein the second direction is a direction in which the camera module is pitched, and
wherein the third direction is a direction in which the camera module is rolled.

19. The camera device of claim 16, wherein the first magnet has different polarities on upper and lower portions of an outer side surface thereof, and
wherein the second coil is configured to receive a current separately from the first coil.

20. The camera device of claim 16, wherein the second magnet has different polarities on both side portions of an outer side surface thereof, and
wherein the third coil is configured to receive current separately from the first coil and the second coil.

* * * * *